United States Patent
Boyd et al.

(10) Patent No.: US 7,245,801 B2
(45) Date of Patent: Jul. 17, 2007

(54) APPARATUS WITH A SERIES OF RESONATOR STRUCTURES SITUATED NEAR AN OPTICAL WAVEGUIDE FOR MANIPULATING OPTICAL PULSES

(75) Inventors: Robert W. Boyd, Rochester, NY (US); John E. Heebner, Livingston, NJ (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 10/394,894

(22) Filed: Mar. 21, 2003

(65) Prior Publication Data

US 2003/0231826 A1   Dec. 18, 2003

Related U.S. Application Data

(60) Provisional application No. 60/367,062, filed on Mar. 21, 2002.

(51) Int. Cl.
G02B 6/26 (2006.01)
G02B 6/42 (2006.01)

(52) U.S. Cl. .............................. 385/27; 385/30; 372/97

(58) Field of Classification Search .................. 385/15, 385/27, 30; 372/92, 97
See application file for complete search history.

(56) References Cited

U.S. PATENT DOCUMENTS

| 6,108,474 | A | 8/2000 | Eggleton et al. ............ 385/122 |
| 6,208,792 | B1 | 3/2001 | Hwang et al. ............... 385/129 |
| 6,580,534 | B2 * | 6/2003 | Madsen ....................... 398/63 |
| 6,580,851 | B1 * | 6/2003 | Vahala et al. ................. 385/30 |
| 6,594,425 | B2 * | 7/2003 | Tapalian et al. .............. 385/50 |
| 6,643,421 | B1 * | 11/2003 | Chin et al. ..................... 385/15 |
| 6,751,377 | B2 * | 6/2004 | Baumann et al. .............. 385/32 |
| 6,865,317 | B2 * | 3/2005 | Vahala et al. ................. 385/30 |
| 6,876,796 | B2 * | 4/2005 | Garito et al. ................. 385/50 |
| 2002/0039470 | A1 * | 4/2002 | Braun et al. .................. 385/50 |
| 2004/0023396 | A1 | 2/2004 | Boyd et al. ................. 435/872 |

OTHER PUBLICATIONS

Heebner, J. et al., "SCISSOR Solutions And Other Novel Propagation Effects In Microresonator Modified Waveguides," J. Opt. Soc. Am. B, 19:722-31 (2002).

(Continued)

Primary Examiner—Sung Pak
Assistant Examiner—Daniel Petkovsek
(74) Attorney, Agent, or Firm—Nixon Peabody LLP

(57) ABSTRACT

Systems and method for manipulating optical pulses to implement an optical switch and for pulse shaping (e.g., pulse compression and/or compression) are disclosed. In one embodiment, the system comprises an optical switch apparatus that includes a plurality of resonators optically coupled to a waveguide, two output waveguides, an input light source, a control light source. The system selects some of the input signals emitted from the input light course using control signals emitted from the control light source to route to one of the output waveguides. In another embodiment, the system includes a waveguide optically coupled to a plurality of resonators, input light source, optional resonator modules that can change the refractive index of the resonators, and an optional amplifier. This system can change the shape of the pulses by changing a number of parameters, such as the incoming pulse amplitude and/or the refractive index of the resonators.

27 Claims, 11 Drawing Sheets

OTHER PUBLICATIONS

Heebner, J. et al., "Slow Light, Induced Dispersion, Enhanced Nonlinearity, And Optical Solitons In A Resonator-Array Waveguide," Physical Review E, 65:036619-1-036619-4 (2002).

Pereira, S. et al., "Gap Solitons In A Two-Channel Microresonator Structure," Optics Letters, 27:536-38 (2002).

Little, B. et al., "Filter Synthesis For Periodically Coupled Microring Resonantors," Optics Letters, 25:344-46 (2000).

Heebner, J. et al., "Enhanced All-Optical Switching By Use Of A Nonlinear Fiber Ring Resonator," Optics Letters, 24:847-49 (1999).

McCall, S. et al., "Whispering-gallery mode microdisk lasers," Appl. Phys. Lett. 60:289-91 (1992).

Yamamoto, Y. et al., "Optical Processes in microcavities," Phys. Today 46:66-74 (1993).

Knight, J. et al., "Core-resonance capillary-fiber whispering-gallery-mode laser," Opt. Lett. 17:1280-82 (1992).

Popp, J. et al., "$Q$-switching by saturable absorption in microdroplets: elastic scattering and laser emission," Opt. Lett. 22:1296-98 (1997).

Little, B. et al., "Microring resonator channel dropping filters," J. Lightwave Technol. 15:998-1005 (1997).

Schiller, S. et al., "High-resolution spectroscopy of whispering gallery modes in large dielectric spheres," Opt. Lett. 16:1138-1140 (1991).

Vassiliev, V. et al., "Narrow-line-width diode laser with a high-$Q$ microsphere resonator," Opt. Commun. 158:305-12 (1998).

Madsen, C. et al., "Optical all-pass filters for phase response design with applications for dispersion compensation," IEEE Photon. Technol. Lett. 10:944-96 (1998).

Braginsky, V., "Quality-factor and nonlinear properties of optical whispering-gallery modes," Phys. Rev. A 137:393-97 (1989).

Blom, F. et al., "Experimental study of integrated-optics microcavity resonators: toward an all-optical switching device," Appl. Phys. Lett. 71:747-49 (1997).

Vernooy, D. et al., "High-$Q$ measurements of fused-silica microspheres in the near infrared," Opt. Lett. 23:247-49 (1998).

Braginsky, V. et al., "Properties of optical dielectric microresonators," Sov. Phys. Dokl. 32:306-07 (1987).

Lenz ,G. et al., "Dispersive properties of optical filters for WDM systems," IEEE J. Quantum Electron. 34:1390-1402 (1998).

Absil, P. et al., "Wavelength conversion in GaAs micro-ring resonators," Opt. Lett. 25:554-56 (2000).

Xu, Y. et al., "Propagation and second-harmonic generation of electromagnetic waves in a coupled-resonator optical waveguide," J. Opt. Soc. Am. B 17:387-400 (2000).

Gorodetsky, M., "Ultimate $Q$ of optical microsphere resonators," Opt. Lett. 21:453-55 (1996).

Lenz, G. et al., "Large Kerr effect in bulk Sebased chalcogenide glasses," Opt. Lett. 25:254-56 (2000).

Little, B. et al., "Estimating surface roughness loss and output coupling in microdisk resonators," Opt. Lett. 21:1390-92 (1996).

Chen, W. et al., "Gap solitons and the nonlinear optical response of superlattices," Phys. Rev. Lett. 58:160-63 (1987).

Eggleton, B. et al., "Bragg grating solitons," Phys. Rev. Lett. 76:1627-30 (1996).

Yariv, A. et al., "Coupled resonator optical waveguide: a proposal and analysis," Opt. Lett. 24:711-13 (1999).

Lukin, M. et al., "Spectroscopy in dense coherent media: line narrowing and interference effects," Phys. Rev. Lett. 79:2959-62 (1997).

Matsko, A. et al., "Using slow light to enhance acousto-optical effects: application to squeezed light," Phys. Rev. Lett. 84: 5752-55 (2000).

Matsko, A. et al., "Anomalous stimulated Brillouin scattering via ultraslow light," Phys. Rev. Lett. 86:2006-09 (2001).

Arnold, S. et al., "Room-temperature microparticle-based persistent spectral hole burning memory," Opt. Lett. 16:420-22 (1991).

Dubreuil, N. et al., "Eroded monomode optical fiber for whispering-gallery mode excitation in fused-silica microspheres," Opt. Lett. 20:813-15 (1995).

Rafizadeh, D. et al., "Waveguide-coupled AlGaAs/ GaAs microcavity ring and disk resonators with high finesse and 21.6 nm free-spectral range," Opt. Lett. 22:1244-46 (1997).

Laine, J.-P. et al., "Etch-eroded fiber coupler for whispering-gallery-mode excitation in high-$Q$ silica microspheres," IEEE Photon. Technol. Lett. 11:1429-30 (1999).

Cai, M. et al., "Observation of critical coupling in a fiber taper to a silica-microsphere whispering-gallery mode system," Phys. Rev. Lett. 85:74-77 (2000).

Little, B. et al., "Toward very large-scale integrated photonics," Opt. Photon. News 11:24-29 (2000).

Lenz, G. et al., "Optical delay lines based on optical filters," IEEE J. Quantum Electron, 37:525-532 (2001).

Boyd, R. et al., "Sensitive Disk Resonator Photonic Biosensor," Applied Optics, 40(31):5742-47 (2001).

Blair, S. et al., "Resonant-Enhanced Evanescent-Wave Fluorescence Biosensing With Cylindrical Optical Cavities," Applied Optics, 40(4):570-582 (2001).

Kolomenskii, A. et al., "Surface-Plasmon Resonance Spectrometry and Characterization of Absorbing Liquids," Applied Optics, 39(19):3314-3320 (2000).

Kolomenskii, A. et al., "Sensitivity and Detection Limit of Concentration and Adsorption Measurement by Laser-Induced Surface-Plasmon Resonance," Applied Optics, 36(25):6539-6547 (1997).

Luff, B. et al., "Integrated-Optical Directional Coupler Biosensor," Optics Letters, 21(8):618-620 (1996).

Sokoloff, J. et al., "A Terahertz Optical Asymmetric De-Multiplexer (TOAD)," IEEE Photon. Technol. Lett. 5:787-90 (1993).

Djordjev, K. et al., "Microdisk Tunable Resonant Filters and Switches," IEEE Photon. Technol. Lett. 14, 6:828-30 (2002).

Armani, D. et al., "Untra-high-$Q$ toroid microcavity on a chip," Nature, 421, 27:925-928 (2003).

Madsen, C.K. et al., "Integrated All-Pass Filters for Tunable Dispersion and Dispersion Slope Compensation," IEEE Photon. Technol. Lett. 11, 12:1623-25 (1999).

Little, B. et al., "Microring Resonator Arrays for VLSI Photonics," IEEE Photon. Technol. Lett. 12, 3:323-25 (2002).

Djordjev, K. et al., "Vertically Coupled InP Microdisk Switching Devices With Electroabsorptive Active Regions," IEEE Photon. Technol. Lett. 14, 8:115-17 (2002).

* cited by examiner

APPARATUS WITH A SERIES OF RESONATOR STRUCTURES SITUATED NEAR AN OPTICAL WAVEGUIDE FOR MANIPULATING OPTICAL PULSES

This application claims the benefit of U.S. Provisional Patent Application Ser. No. 60/367,062 filed on Mar. 21, 2002, which is herein incorporated by reference.

This invention was developed with Government funding from the Air Force Office of Scientific Research under grant F49620-00-1-1061 and the Defense Advanced Research Projects Agency under grant MDA972-00-1-0021. The U.S. Government may have certain rights in this invention.

FIELD OF THE INVENTION

This invention relates generally to optical waveguides and, more particularly, to an apparatus with a series of resonator structures situated near an optical waveguide for manipulating optical pulses, such as for pulse stretching, compression and switching, and for creating pulse trains.

BACKGROUND OF THE INVENTION

In general, optical waveguides are formed of a length of transparent material that is surrounded by another material which has a lower index of refraction. Light beams propagating within the waveguide that intersect the interface between the transparent waveguide material and the surrounding material with the lower index of refraction at angles equal to or greater than the critical angle are trapped in the waveguide and travel losslessly along it.

Optical waveguides, such as optical fiber, have been used in many different applications. For instance, waveguides are used in optical switching technologies and for performing pulse compression. While current waveguide arrangements used in these applications work, they result in devices that are either too slow and/or require long lengths of optical waveguides to function. For instance, some optical pulse shaping devices, such as the optical switches disclosed by U.S. Pat. No. 6,208,792 to Hwang et al. and the optical pulse compressor disclosed by U.S. Pat. No. 6,108,474 to Eggleton et al., require kilometer-long spools of fiber to function properly.

SUMMARY OF THE INVENTION

An apparatus for manipulating optical pulses in accordance with an embodiment of the present invention includes a first optical waveguide with a first input for receiving one or more optical pulses, and a plurality of resonator structures, each of the resonator structures optically coupled to, but spaced from, the first optical waveguide.

A method for manipulating optical pulses in accordance with an embodiment of the present invention includes propagating an input pulse signal along a first optical waveguide, and adjusting an intensity within a plurality of resonator structures optically coupled to, but spaced at least a first distance away from a portion of the first optical waveguide to alter at least one property of the input pulse signal.

An optical switch in accordance with an embodiment of the present invention includes a first optical waveguide with a first input for receiving one or more optical pulses, and a plurality of resonator structures where each of the resonator structures are optically coupled to, but spaced at least a first distance away from the first optical waveguide, a second optical waveguide with a second input for receiving one or more control pulses. Further, the apparatus includes one or more beam splitters coupled to the first and second optical waveguides, In each of the beam splitters, there is a section of the first optical waveguide that is adjacent to a section of the second optical waveguide.

A method for switching optical pulses in accordance with an embodiment of the present invention includes propagating an input pulse signal along a first optical waveguide, propagating a control pulse signal along a second optical waveguide, splitting the input pulse signal into first and second portions and the control pulse signal into third and fourth portions one or more times, combining the first portion split from the input pulse signal with the third portion split from the control pulse signal and the second portion split from the input pulse signal with the fourth portion split from the control pulse signal each time the splitting the input pulse and control pulse signals is performed, and propagating the first and third portions past a plurality of resonator structures optically coupled to, but spaced at least a first distance away from a portion of the first optical waveguide to alter a property of the first portion.

A system for manipulating optical pulses to compress or stretch the optical pulses in accordance with an embodiment of the present invention includes a first optical waveguide with a first input for receiving one or more optical pulses, a plurality of resonator structures optically coupled to, but spaced from the first optical waveguide, and a pulse shaping system that changes at least one of a refraction index and a finesse value for one or more of the resonator structures.

A method for manipulating optical pulses to compress or stretch the optical pulses in accordance with an embodiment of the present invention includes propagating an input pulse signal along a first optical waveguide, adjusting an intensity within a plurality of resonator structures optically coupled to, but spaced at least a first distance away from a portion of the first optical waveguide to alter at least one property of the input pulse signal, changing at least one of a refraction index and a finesse value for one or more of the resonator structures to control how the at least one property of the input signal is altered.

The embodiments of the present invention provides a number of advantages. For example, invention produces a dispersion that is about seven orders of magnitude greater than that of conventional mediums, such as optical fiber, with similarly enhanced nonlinearity, resulting in enabling devices that can be made very small and which can be easily integrated with other photonic technologies. Further, the present invention enables very fast switching, routing, demultiplexing, and/or pulse compression and/or stretching, for example, to take place using the resonators 12(1)–12(n) in the manner described above.

DETAILED DESCRIPTION OF THE INVENTION

Figure 1:
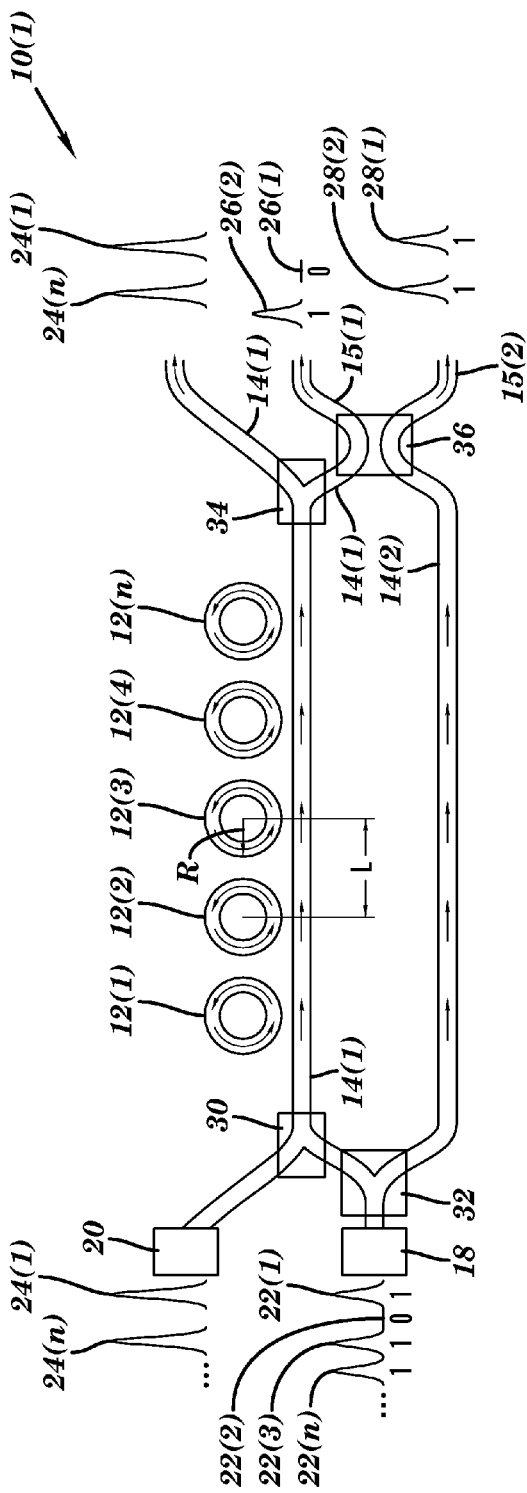
FIG. 1 is a top view of a system for manipulating optical pulses in accordance with one embodiment of the present invention.
Figure 4:
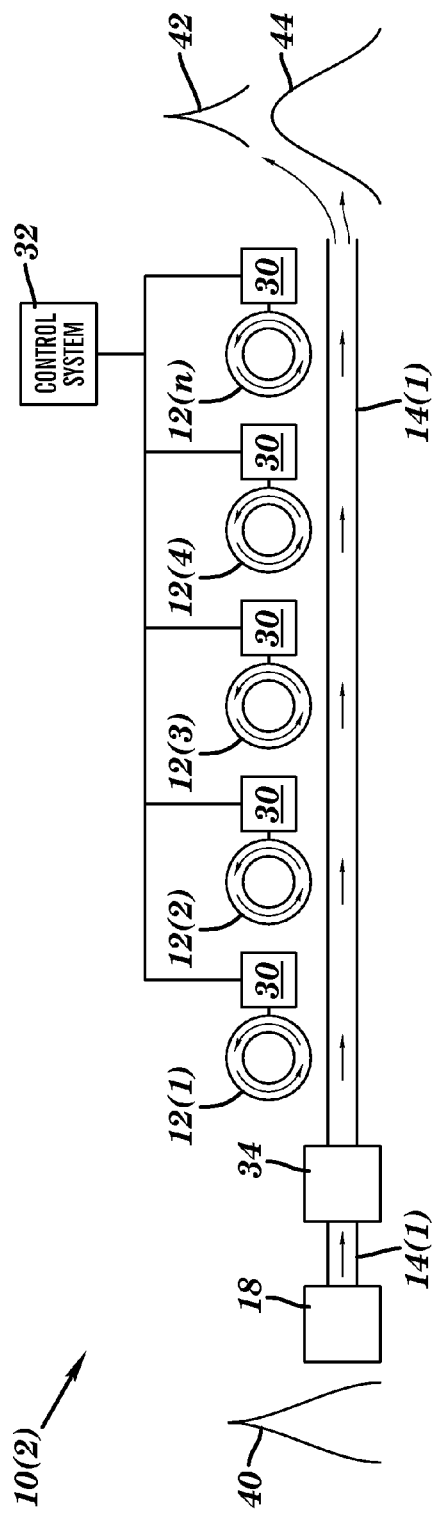
FIG. 4 is a top view of a system for manipulating optical pulses in accordance with another embodiment of the present invention.

Systems 10(1)–10(2) for manipulating optical pulses in accordance with different embodiments of the present invention are illustrated in FIGS. 1 and 4. The systems 10(1)–10(2) each include resonators 12(1)–12(n), one or more optical waveguides 14, and an input light source 18. The systems 10(1)–10(2) provides a number of advantages, such as systems 10(1)–10(2) which can be made very small and which can be easily integrated with other photonic technologies. Further, the systems 10(1)–10(2) enable very fast switching, routing, demultiplexing, and/or pulse compression and/or stretching.

Referring to FIG. 1, a system 10(1) for manipulating optical pulses to implement an optical switch in accordance with one embodiment of the present invention is illustrated. In this particular embodiment, the optical switch system 10(1) includes resonators 12(1)–12(n), waveguides 14(1) and 14(2), output waveguides 15(1) and 15(2), input light source 18, control light source 20, combiner 30, beam splitter 32, filter 34, and directional coupler 36. The system 10(1) selects some of the input signals 22(1)–22(n) using control signals 24(1)–24(n) to route to one of the one of the output waveguides 15(1) and 15(2).

The resonators 12(1)–12(n) are waveguides that are made of glass on a substrate, although polymers or crystalline semiconductor materials can be used. Alternatively, the resonators 12(1)–12(n) could comprise optical fiber. Each of the resonators 12(1)–12(n) can have a radius ("R") ranging from about 2 µm to about 50 µm, and a resonator-air refractive index ratio of about 3.4 to about 1.5. Further, the resonators 12(1)–12(n) can be spaced apart from each other any distance ("L"), such as from about 10 µm to about 20 µm, along the optical waveguide 14(1) as shown, where the distance L is measured between the center of any two of the resonators 12(1)–12(n). An important factor to consider when spacing the resonators 12(1)–12(n) from each other is to avoid spacing any two resonators too closely together so that they achieve evanescent or optical coupling. Generally, if there is a distance between any two of the resonators 12(1)–12(n) that is greater or equal to about the size of a diameter of one of the resonators 12(1)–12(n) incremented by 1 µm, where the distance is measured between the outermost portion of the outer edge in each of the two resonators, then the two resonators will not achieve optical coupling.

The resonators 12(1)–12(n) are each formed adjacent to a portion of the waveguide 14(1), which will be referred to hereinafter as "evanescent" or "optical" coupling and variations thereof In this particular embodiment, the distance between one or more of the resonators 12(1)–12(n) and the optical waveguide 14(1) can range from about 0.05 µm to about 0.5 µm, although a distance from about 0.1 µm to about 0.3 µm is typical. This distance can, of course, be adjusted to accommodate different parameters resulting from changes in materials and/or to effect desired changes upon the input pulse signal 22 as will be described in connection with other embodiments.

In this particular embodiment, each of the resonators 12(1)–12(n) have a "ring" shape with substrate material inside the ring defining the outer band waveguide, although the resonators 12(1)–12(n) may have a "disk" shape with no substrate material present within the disk. A disk shape supports higher order radial modes which may be unintentionally excited. The ring shape can substantially restrict the number of radial modes, but the presence of another etched sidewall (e.g., outer band waveguide) will introduce additional roughness-induced scattering losses. The width of the outer band waveguide can range from about 0.3 µm to about 1 µm, although the waveguides can be tapered out to about 8 µm for ease of coupling to fiber-optics based systems.

The optical coupling of the resonators 12(1)–12(n) to the optical waveguide 14(1) is "weak" in embodiments of the present invention, which means that the resonators 12(1)–12(n) and the optical waveguide 14(1) are not directly connected to each other, although they are formed being very close to each other. This weak coupling allows the light intensity from the input pulse signal 22 to build up to high values within the resonator. The ratio of the circulating intensity within each of the resonators 12(1)–12(n) to the incident intensity is defined to be the "buildup factor" B of the configuration. This buildup factor B is related to the "finesse" F, a term which is used to describe the resonators 12(1)–12(n) through the relation $B=(2/\pi)F$.

In general, the process for making resonators 12(1)–12(n) involves deposition of a vertical light-guiding structure onto a substrate and subsequent etching of the structure to form the lateral light-guiding structures which constitute the resonators 12(1)–12(n). The deposition may be carried out via sputtering, chemical vapor deposition, or molecular beam epitiaxy ("MBE"), for example. For the deposition of crystalline AlGaAs, MBE is the typical method of deposition. To define the vertical photonic structure that will guide light in the systems 10(1)–10(2) of the present invention, three layers of AlGaAs are deposited above a GaAs substrate. The middle, high-index light-guiding layer is of the order of about 1 µm thick.

The subsequent etching is accomplished in several steps as described herein below. First, a thin layer of $SiO_2$ is deposited above the MBE grown structure via chemical vapor deposition. An electron-beam resist, such as PMMA, is then spin coated on top to a thickness of about 150 nm. A pattern of trenches which laterally define the structures is used to raster-expose the resist. The resist is then developed and used as an etch mask for transferring the pattern into the underlying $SiO_2$ layer. This is accomplished via reactive ion etching ("RIE") with $CHF_3$. Finally, the pattern is transferred into the AlGaAs structure using chemically assisted ion beam etching ("CAIBE"), although electron cyclotron resonance ("ECR") etching or inductively coupled plasma ("ICP") etching may be used.

Further, the resonators $12(1)$–$12(n)$ can be configured using known techniques, such as the process described in McCall et al., "Whispering-gallery mode microdisk lasers," Appl. Phys. Lett. 60, 289–291 (1992); Yamamoto & Slusher, "Optical processes in microcavities," Phys. Today 46, 66–74 (1993); Rayleigh, "The problem of the whispering gallery," Philos. Mag. 20, 1001–1004 (1910); Braginsky & Ilchenko, "Properties of optical dielectric microresonators," Sov. Phys. Dokl. 32, 306–307 (1987); Rafizadeh et al., "Waveguide-coupled Al-GaAs/GaAs microcavity ring and disk resonators with high finesse and 21.6-nm free spectral range," Opt. Lett. 22, 1244–1246 (1997), all of which are hereby incorporated herein by reference in their entirety.

As mentioned above, each of the resonators $12(1)$–$12(n)$ can be formed of glasses, polymers or crystalline semiconductor materials. Glasses are typically easier to work with and have low loss characteristics, but formation of resonators $12(1)$–$12(n)$ with a radius of less than about 10 µm is difficult to achieve using glass. Semiconductor materials are capable of forming resonators $12(1)$–$12(n)$ that achieve typical dimensions in accordance with the embodiments of the present invention as described herein. Exemplary glasses include, without limitation, silica ($SiO_2$), arsenic selenide ($As_2Se_3$), and silicon nitride ($Si_3N_4$). Exemplary semiconductors systems include, without limitation, aluminum gallium arsenide (AlGaAs) and indium phosphide (InP). Other glasses, polymers and crystalline semiconductor materials that are suitable for carrying optical signals are continually being identified and can also be used in the present invention.

The waveguide $14(1)$ is a path on the same substrate as the resonators $12(1)$–$12(n)$ where control signal pulses $24(1)$–$24(n)$ and portions of the input signals $22(1)$–$22(n)$ can propagate. The width of the optical waveguide $14(1)$ can range from about 0.3 µm to about 1 µm, although the waveguide can be tapered out to about 8 µm for ease of coupling to fiber-optics based systems.

The waveguide $14(1)$ runs downstream from the control light source 20 to the combiner 30, downstream from the combiner 30 parallel to the resonators $12(1)$–$12(n)$, along the resonators $12(1)$–$12(n)$, and into filter 34, where a portion of the waveguide $14(1)$ runs into the directional coupler 36 and another portion continues to a receiving device (not illustrated). The waveguide $14(1)$ is formed using the etching process described above.

The waveguide $14(2)$ is a path on the same substrate as the resonators $12(1)$–$12(n)$ where portions of the input signals $22(1)$–$22(n)$ can propagate. Further, the waveguide $14(2)$ runs parallel to the waveguide $14(1)$ downstream from the beam splitter 32 to the directional coupler 36. The waveguide $14(1)$ has the same width as the waveguide $14(1)$. In this particular embodiment, the combination of the waveguides $14(1)$ and $14(2)$ and the beam splitter 36 as shown form a Mach-Zehnder interferometer, although other configurations of the waveguides $14(1)$ and $14(2)$ can be used, such as Michaelson and Sagnac interferometers, as well as other types and numbers of components. Further, the waveguide $14(2)$ is formed using the same process used to form the waveguide $14(1)$.

The first output waveguide $15(1)$ and a second output waveguide $15(2)$ are each formed in the same manner and with the same dimensions as the waveguide $14(1)$. Further, the first output waveguide $15(1)$ and the second output waveguide $15(2)$ are downstream from and coupled to the directional coupler 36. The first output waveguide $15(1)$ outputs first output pulse signals $26(1)$–$26(2)$ to a receiving device (not illustrated) and the second output waveguide $15(2)$ outputs second output pulse signals $28(1)$–$28(2)$ to another receiving device (not illustrated).

The input light source 18 is coupled to the waveguide $14(1)$ by fixing a fiber source or semiconductor-based laser to an appropriately tapered input portion of the waveguide $14(1)$. In embodiments of the present invention, the input light source 18 is a pulsed light source, although the light source 18 can emit polarized pulsed light, either directly or as a result of polarizing filters (not illustrated) positioned between the light source 18 and the waveguide $14(1)$ coupled thereto. Average power levels of about one milliwatt are sufficient, although other power levels may be used. Further, the input light source 18 provides the input pulse signals $22(1)$–$22(n)$ to the waveguide $14(1)$, which propagate along the waveguide as described further herein below. Further, the input light source 18 is coupled to a processor or other type of mechanism (not illustrated) that manages the light source 18 in order to produce the input pulse signals $22(1)$–$22(n)$, which may represent multiplexed pulsed light signals, for example.

The control light source 20 is coupled to the waveguide $14(2)$ in the same manner as the light source 18 is coupled to the waveguide $14(1)$. Further, the same types of control light sources 20 may be used as the input light source 18, including a control light source 20 that can emit polarized light, along with the same power levels used by the light source 18. In this particular embodiment, the control light source 20 provides control pulse signals $24(1)$–$24(n)$ to the waveguide $14(2)$, which propagates along the waveguide $14(2)$ as described in further detail herein below. Further, the control light source 20 is coupled to a processor or other type of mechanism (not illustrated) that manages the control light source 20 in order to produce the control pulse signals $24(1)$–$24(n)$, which may represent a timed pulsed light signal that is time synchronized with the input pulse signals $22(1)$–$22(n)$, for example.

The combiner 30 is coupled to the waveguide $14(1)$ downstream from the control light source 20 and a portion of the waveguide $14(2)$ downstream from the splitter 32. The combiner 30 can combine a portion of the input pulse signal 22 propagating in the waveguide $14(2)$ with a portion of the control pulse signal 24 propagating in the waveguide $14(1)$. A variety of different types of combiners 30 can be used.

The beam splitter 32 is coupled to a portion of the waveguide $14(1)$ upstream from the combiner 30 and to the waveguide $14(2)$ downstream from the input light source 18. A variety of different types of beam splitters 32 can be used which split the optical beam into differing numbers of parts. In this particular embodiment, the beam splitter 32 is positioned to receive and split each one of the input pulse signals $22(1)$–$22(n)$ into two portions. Each of the split portions from each of the input pulse signals $22(1)$–$22(n)$ represent about half of the input pulse signal, although the proportions of each portion and the number of portions can vary as needed for the particular application.

The filter 34 is coupled to the waveguide $14(1)$ and is positioned downstream from the resonators $12(1)$–$12(n)$. The filter 34 receives the control pulse signals $24(1)$–$24(n)$ and the split portion of the input pulse signals $22(1)$–$22(n)$ and filters out the control pulse signals 24(1)–24(n). Further, a portion of the waveguide 14(1) continues downstream from the filter 34 and into the directional coupler 36, while a portion of the waveguide 14(1) continues downstream from the filter 34 to a receiving device (not illustrated) that receives the filtered out control pulse signals 24(1)–24(n). A variety of different types of filters 34 can be used.

The directional coupler 36 is coupled to a portion of the waveguide 14(1) downstream from the filter 34, to a portion of the waveguide 14(2) downstream from the beam splitter 32, and to a first output waveguide 15(1) and a second output waveguide 15(2). In this particular embodiment, the waveguides 14(1) and 14(2) are weakly coupled at the location of the directional coupler 36. A variety of different types of directional couplers 36 can be used. In this particular embodiment, the directional coupler 36 is positioned to receive and further split the split portion from each of the input pulse signals 22(1)–22(n) propagating in the waveguide 14(2) into another two sub-portions. Further, the directional coupler 36 receives and further splits the split portion from each of the input pulse signals 22(1)–22(n) propagating in the waveguide 14(1) into two sub-portions, which may or may not be phase shifted depending upon the presence of a corresponding control pulse signal 24.

Each of the sub-portions from each input pulse signal 22(1)–22(n) propagating in the waveguides 14(1), 14(2) represent about half of each respective split signal, although the proportions of each sub-portion and the number of sub-portions can vary as needed for the particular application. Furthermore, in this particular embodiment the waveguides 14(1) and 14(2) are weakly coupled at the location of the directional coupler 36. This arrangement causes the sub-portions from each of the input pulse signals 22(1)–22(n) propagating in the waveguides 14(1), 14(2) to recombine with each other, with destructive and constructive relationships between the two in view of whether some of the sub-portions of the input pulse signals 22(1)–22(n) are phase shifted resulting in creating first output signals 26(1)–26(2) and second output signal 28(1)–28(2) as explained in more detail further herein below.

Although the resonators 12(1)–12(n) and the waveguides 14(1), 14(2), are described as being formed in or on a substrate, it should be appreciate that the system 10(1) may use optical fibers in place of the waveguides 14(1), 14(2).

Figure 2:
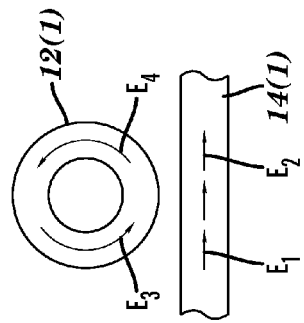
FIG. 2 is an enlarged top view of a resonator used in the system of FIG. 1.
Figure 3A:
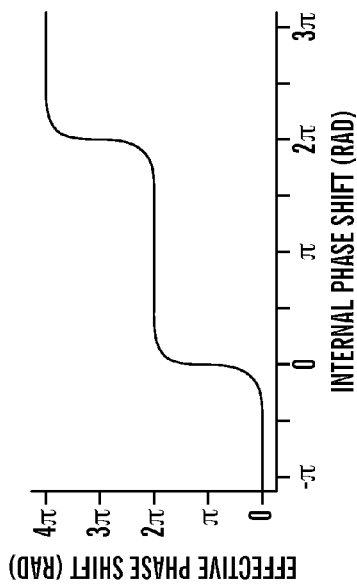
FIG. 3 is a graph showing a plot of a transmission, build-up factor, effective phase shift acquired to transmission, and phase sensitivity plotted versus the internal phase shift of waveguide coupled resonators in accordance with embodiments of the present invention.
Figure 3C:
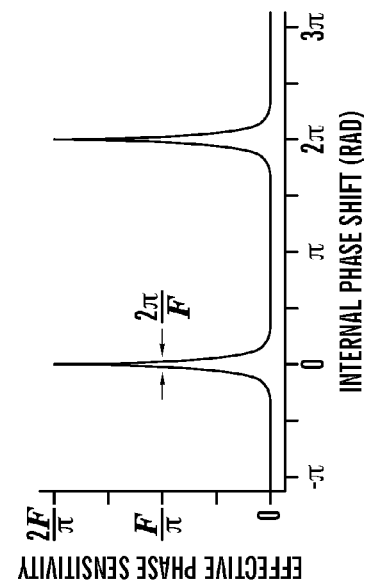
Figure 3B:
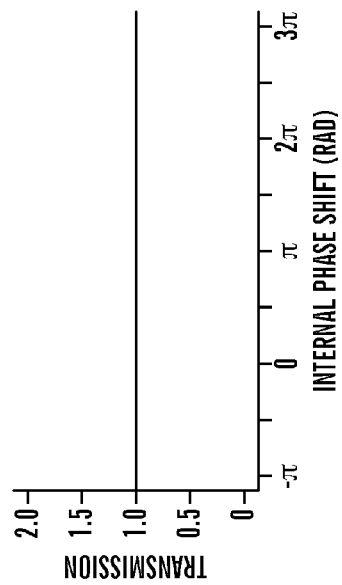
Figure 3D:
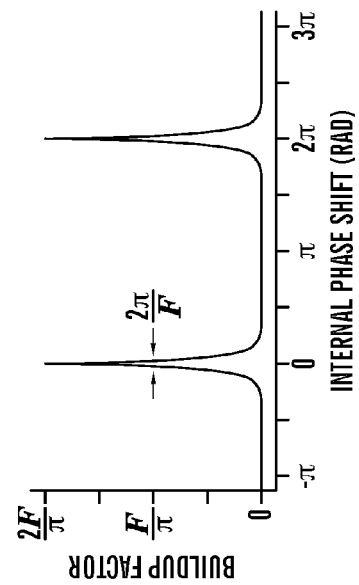

The operation of the system 10(1) for manipulating optical pulses to implement an optical switch in accordance with another embodiment of the present invention will now be described with reference to FIGS. 1–3. The operation begins by the input light source 18 emitting the input pulse signal 22(1). At substantially the same time, the control light source 20 emits the control pulse signal 24(1) in this example, although the signal 22(1) does not need to be emitted at this point. In this example, the input pulse signals 22(1)–22(n) and the control pulse signals 24(1) are time synchronized. Further, the control pulse signal 24(1) is a timed signal that is emitted by the control light source 20 at set periods of time, although the signals may be emitted in random increments.

In this example, the amplitude of the input pulse signal 22(1), such as from about 10 mWatts to about 100 Watts, for a given wavelength, such as, 300–1800 nm, can represent a first value of "1" for the signal 22(1) as shown in FIG. 1, although other amplitudes and wavelengths may be used. Further in this example, the amplitude of the corresponding control pulse signal 24(1), such as 10 microwatts to 1 Watt, represents a peak amplitude value for the signal 24(1), although again, other amplitudes and wavelengths may be used.

Next, the input pulse signal 22(1) propagates along the waveguide is 14(2) where it is split by the beam splitter 32 into two portions, while at substantially the same time the control pulse signal 24(1) propagates along the waveguide 14(1) where it is combined with the split portion from the input pulse signal 22(1). The combined control pulse signal 24(1) and the split portion of the input pulse signal 22(1) propagate down the waveguide 14(1), although they do not interfere with each other.

Next, the combined control pulse signal 24(1) and the split portion of the input pulse signal 22(1) propagating along the waveguide 14(1) as shown by the arrows in the waveguide 14(1) enter the first resonator 12(1) at a section of the waveguide 14(1) where it is weakly coupled to the resonator 12(1). Referring to FIG. 2, the propagation of the combined 22(1) and 24(1) signals within the first resonator 12(1) and its effects thereupon will now be described in further detail. $E_1$ depicts the incident signals 22(1), 24(1), $E_4$ depicts the signals 22(1), 24(1) injected into the resonator 12(1), $E_3$ depicts the signals 22(1), 24(1) after one pass around the resonator 12(1), and $E_2$ depicts the transmitted signals 22(1), 24(1). First, the basic relations among the incident ($\tilde{E}_1$), transmitted ($\tilde{E}_2$), and circulating ($\tilde{E}_3$, $\tilde{E}_4$) signals 22(1), 24(1) in resonator 12(1) will be discussed. In the spectral domain, the signals exiting the coupling region are related to the input signals through the following unitary matrix:

$$\begin{bmatrix} \tilde{E}_4(\omega) \\ \tilde{E}_2(\omega) \end{bmatrix} = \begin{bmatrix} r & it \\ it & r \end{bmatrix} \begin{bmatrix} \tilde{E}_3(\omega) \\ \tilde{E}_1(\omega) \end{bmatrix}, \tag{1}$$

The lumped self and cross-coupling coefficients r and t are assumed to be independent of radian frequency ($\omega$), and satisfy the relation $r^2+t^2=1$. Propagation along the circumference ($2\pi R$) of the resonator 12(1) may take the form of a mode of a ring waveguide or whispering-gallery mode of a disk or sphere with effective index $n_{\it eff}$, as disclosed by V. B. Braginsky and V. S. Ilchenko, "Properties of optical dielectric microresonators," Sov. Phys. Dokl. 32, 306–307 (1987), which is incorporated herein by reference in its entirety. Along this feedback path, assuming attenuation and intrinsic dispersion are negligible, the signal simply acquires an internal phase shift ø as shown in the following relationships:

$$\tilde{E}_3(\omega) = \exp[i\phi(\omega)]\tilde{E}_4(\omega), \tag{2}$$

$$\phi(\omega) = 2\pi R n_{\it eff} \omega/c. \tag{3}$$

Solving Eqs. (1) and (2) yields the following expressions for the transmitted $\tilde{E}_2$ and circulating $\tilde{E}_3$ steady-state monochromatic signals:

$$\tilde{E}_2(\omega) = \exp[-i\phi(\omega)] \frac{r - \exp[i\phi(\omega)]}{1 - r\exp[i\phi(\omega)]} \tilde{E}_1(\omega), \tag{4}$$

$$\tilde{E}_3(\omega) = \frac{it\exp[i\phi(\omega)]}{1 - r\exp[i\phi(\omega)]} \tilde{E}_1(\omega). \tag{5}$$

The transmission $[\tilde{E}_2/\tilde{E}_1]^2$ is equal to unity for all values of $\omega$, and thus the signal traversing the resonator 12(1) simply acquires a transmitted phase shift Φ that exhibits the following frequency dependence:

$$\tilde{E}_2(\omega) = \exp[i\Phi(\omega)]\tilde{E}_1(\omega), \quad (6)$$

$$\Phi(\omega) = \pi + \phi(\omega) + 2\arctan\frac{r\sin\phi(\omega)}{1 - r\cos\phi(\omega)}. \quad (7)$$

Near resonance, the transmitted phase shift Φ becomes increasingly more sensitively dependent on the internal phase shift ø with increasing values of r. This increase in the slope of Φ verses ø is attained at the price of a slower response time. In addition to the increased phase sensitivity (dΦ)/dø), the circulating intensity becomes more intense in comparison with the incident intensity as a consequence of the coherent buildup of input power. This intensity enhancement or buildup factor is derived from Eq. (5) as:

$$\beta(\omega) = \left|\frac{\tilde{E}_3(\omega)}{\tilde{E}_1(\omega)}\right|^2 \quad (8)$$

$$= \frac{1-r^2}{1-2r\cos\phi(\omega)+r^2}$$

$$\xrightarrow{r\approx 1} \frac{\beta_0}{1+\beta_0^2\sin^2[\phi(\omega)/2]}.$$

Near resonance, the buildup factor is a sharply peaked function of the internal phase shift ø peaking at each integer multiple of 2π rad. The peak of the buildup factor, β0=(1+r)/(1−r), increases dramatically with r. A convenient parameter characterizing the strength of the resonance is the finesse, which is defined as the free spectral range ("FSR") divided by the full width (i.e., bandwidth of the spectral resonance) at half-depth ("FWHD") of the resonance peak. Applying this definition to either the phase sensitivity or the intensity buildup, the finesse is calculated as:

$$F = \frac{FSR}{FWHD} = \frac{2\pi}{2\arccos[2r/(1+r^2)]} \xrightarrow{r\approx 1} \frac{\pi}{1-r}.$$

The finesse value is related to the peak buildup factor as F≈(π/2)β0. This value can be adjusted by varying the distance between each of the resonators 12(1)–12(n) and the waveguide 14(1). The buildup factor and the phase sensitivity (dΦ)/dø) are equal for all ø. This is not a coincidence, rather, the result is a consequence of energy conservation. The increase in stored signal energy results from an equivalent compression in time, which demands a lengthened response time.

Referring to FIG. 3, these fundamental characteristics of the resonator 12(1) are summarized graphically and plotted against the internal phase shift. Graph (a) represents the transmission, graph (b) represents the build-up factor, graph (c) represents the effective phase shift acquired on transmission, and graph (d) represents the phase sensitivity, which is derived from graph (c), plotted versus the internal phase shift for a waveguide-coupled resonator, such as resonator 12(1), with a finesse of 10π, for example.

It should be noted that within a free spectral range ("FSR") or the frequency difference between resonances, a single resonator 12(1) can impart a maximum phase depth of about 2π rad. This limitation has important implications for the maximum delay and chirp and the nonlinear phase that can be imposed on a pulse per resonator 12(1). As the imparted phase nears only π/2 rad, higher-order effects become increasingly significant such that the system can no longer be treated perturbatively. The extent of group-velocity reduction that can be achieved in using resonators 12(1)–12(n) is limited by how high the finesse can be made.

Resonators 12(1)–12(n) with an ultrahigh value of finesse can be used to slow a pulse appreciably, but that pulse must be long enough that it is at least of the order of the finesse times the transit time of a single resonator 12(1)–12(n). Thus, the maximum delay per each of resonators 12(1)–12(n) is fixed and equal to one pulse width at best. The same is true for the induced group velocity dispersion ("GVD"). A high GVD coefficient (proportional to F2) can be obtained if the finesse is made very large. However, the increasing finesse places an increasing restriction on the pulse bandwidth Δω(proportional to 1/F). As a result, the imposed spectral chirp per each of resonators 12(1)–12(n), ½k"effΔω2L, is independent of finesse and dependent only on the scaling factor B.

If broadening a pulse by N pulse widths is desired, then the minimum number of resonators 12(1)–12(n) needed (occurring at B~1) is roughly N. Thus, an ultrahigh finesse is not required for designing dispersive devices based on resonators 12(1)–12(n). However, while reducing the size of a resonator and increasing the finesse in inverse proportion maintains the same resonator bandwidth and thus the same linear properties, and the nonlinear properties are enhanced. This is of fundamental importance, since a low threshold power and small number of resonators 12(1)–12(n) is desirable in practice.

As a result of saturation, it is difficult to achieve an effective nonlinear phase shift of π rad from a single resonator when operating on resonance. It is achieved only in the limit as the resonator's internal phase shift is power detuned completely by π rad, resulting in an external phase shift of π rad as well. As a result of this saturation, one completely loses the advantage of resonant enhancement. A phase shift of π/2 is, however, much easier to attain before the saturation takes place and requires a power detuning of only φ=π/F. A nonlinear external phase shift of π may be readily obtained from one of the resonators 12(1)–12(n), taking advantage of enhancement by ensuring that the resonator is initially red detuned by π/F and allowing the resonator to be power detuned through resonance for a total value of π rad.

Referring back to FIG. 1, the resulting input pulse signal 22(1) which propagates along the first resonator 12(1) one or more times acquires a frequency-dependent phase shift as a result of the presence of the control pulse signal 24(1) that serves to delay or distort the shape of the pulse signal. The phase shifted signal 22(1) propagates downstream from the first resonator 12(1) and propagates through each of the resonators 12(2)–12(n) in the same manner described above with respect to resonator 12(1). After propagating through each of the resonators 12(2)–12(n), the signal 22(1) acquires a total phase shift of about 2π rad. It should be noted that in this example, five resonators 12(1)–12(n) are shown, although any number of resonators may be used depending on the application and desired sensitivity. Thus, each of the resonator resonators 12(1)–12(n) impose a portion of the 2π rad phase shift. Since there are five resonators 12(1)–12(n), each will impose about ⅕$^{th}$ of the 2π rad phase shift.

As set forth further herein below in the "Theoretical Foundations" section, the sequence of resonators 12(1)–12(n) which are weakly coupled to waveguide 14(1) modifies the effective propagation constant of the waveguide 14(1). The modified effective propagation constant can be defined as the accumulated phase per unit length and is composed of the propagation constant of the waveguide 14(1) incremented by a contribution from the transmitted phase of the resonators 12(1)–12(n). For a resonator spacing of L, the effective propagation constant becomes:

$$k_{eff}(\omega) = n_{eff}\omega/c + \Phi(\omega)/L. \qquad (9)$$

Next, the combined control pulse signal 24(1) and the phase shifted split portion of the input pulse signal 22(1) propagate downstream from the last resonator 12(n) and into the filter 34, where the control pulse signal 24(1) is filtered out and just the input pulse signal 22(1) remains. The phase shifted split portion of the input pulse signal 22(1) continues propagating along the waveguide 14(1) into the directional coupler 36.

Next, the directional coupler 36 receives and further splits the phase shifted split portion of the input pulse signal 22(1) into another two sub-portions. Further, the directional coupler 36 receives and further splits the split portion from the input pulse signal 22(1) propagating in the waveguide 14(2) into two sub-portions. Since the phase shifted split portion of the input pulse signal 22(1) propagating in the waveguide 14(1) and the split portion from the input pulse signal 22(1) propagating in the waveguide 14(2) are further split by the directional coupler 36 at a section of the waveguides 14(1) and 14(2) that are weakly coupled, one of the split sub-portions from the phase shifted signal 22(1) in the waveguide 14(1) crosses over to the waveguide 14(2) while one of the split sub-portions from the signal 22(1) propagating along the waveguide 14(2), which is not phase shifted, crosses over to the waveguide 14(1).

Next, the combination of the sub-portions (e.g., the sub-portion of the phase shifted signal 22(1) and the sub-portion of the signal 22(1) with no phase shift) at the portion of the waveguide 14(2) near the directional coupler 36 results in the second output signal 28(1) propagating along the second output waveguide 15(2) downstream from the directional coupler 36 with a value of "1", as shown in FIG. 1. Conversely, the sub-portions (e.g., the sub-portion of the phase shifted signal 22(1) and the sub-portion of the signal with no phase shift) at the portion of the waveguide 14(1) near the directional coupler 36 results in no output signal propagating along the first output waveguide 15(1) downstream from the directional coupler 36.

Next, the above-described process is repeated for the next input pulse signal 22(2) in the same manner set forth above, except as provided herein. The input light source 18 emits the input pulse signal 22(2), while there is no corresponding control pulse emitted from the control light source 20. Thus, the input pulse signal 22(2) is split into two portions by the beam splitter 32, with one portion propagating along the waveguide 14(1) and through the resonators 12(1)–12(n), through the filter 34 and into the directional coupler 36. Since there is no control pulse present, the portion of the input pulse signal 22(2) is not phase shifted. Further, the other portion of the input pulse signal 22(2) split by the beam splitter 32 propagates along the waveguide 14(2) and into the directional coupler 36.

Next, the directional coupler 36 receives and further splits the split portion of the input pulse signal 22(1) propagating along the waveguides 14(1), 14(2), neither of which are phase shifted, into another two sub-portions for each split portion. Since the split portion of the input pulse signal 22(1) propagating in the waveguide 14(1) and the split portion from the input pulse signal 22(1) propagating in the waveguide 14(2) are further split by the directional coupler 36 at a section of the waveguides 14(1) and 14(2) that are weakly coupled, one of the split sub-portions from the signal 22(1) in the waveguide 14(1) crosses over to the waveguide 14(2) while one of the split sub-portions from the signal 22(1) propagating along the waveguide 14(2) crosses over to the waveguide 14(1).

Next, the combination of the sub-portions of the input signal 22(1) from the waveguides 14(1), 14(2) at the portion of the waveguide 14(1) near the directional coupler 36 results in the first output signal 26(1) propagating along the first output waveguide 15(1) downstream from the directional coupler 36 with a value of "0", as shown in FIG. 1. This first output signal 26(1) value corresponds to the value of the input pulse signal 22(2). Conversely, the sub-portions at the portion of the waveguide 14(2) near the directional coupler 36 results in no output signal propagating along the second output waveguide 15(2) downstream from the directional coupler 36.

Thus, the processes described above are repeated for the remaining input pulse signals 22(3)–22(n) and any corresponding, remaining control pulse signals, such as control pulse signal 24(n), in the same manner described above. The system 10(1) and process enables very fast switching, routing and/or demultiplexing, for example, to take place using the resonators 12(1)–12(n) in the manner described above. The system 10(1) achieves a switching, routing and/or demultiplexing rate in the order of about 1 to 5 about picoseconds, where conventional devices can only manage rates in the range of about 4 to 50 milliseconds. As a result, the switching of pulses can be accomplished with a data rate in the order of terabits per second. The system 10(1) uses a low amount of switch energy, such as 1 pico Joule, whereas conventional device require much more. Further, the use of the resonators 12(1)–12(n) allows the system 10(1) to be very small, and allows the system 10(1) to fit on a microchip, for example.

A system 10(2) for manipulating optical pulses to implement a pulse shaping device in accordance with another embodiment of the present invention is illustrated in FIG. 4. The system 10(2) is identical to the system 10(1), except as described herein. In this particular embodiment, the system 10(2) does not include waveguide 14(2), control light source 20, beam splitter 32, combiner 30, filter 34 and directional coupler 36, but includes waveguide 14(1), resonators 12(1)–12(n), input light source 18, optional resonator modules 30, optional amplifier 34, and an optional control system 32 for each of the resonator modules 30. Further, the waveguide 14(1) in this example is coupled to the input light source 18 instead of the control light source 20.

An optional resonator module 30 is coupled to each of the resonators 12(1)–12(n). The resonator modules 30 comprise devices that can alter the refraction index of the resonators 12(1)–12(n), such as electro-optical systems that can apply a voltage across at least one of the resonators 12(1)–12(n) and/or a heat generating source (e.g., temperature resistive heater). Alternatively, the resonator modules 30 comprise devices that can modify the finesse value for each of the resonators 12(1)–12(n), such as micro-electro-mechanical systems ("MEMS") that can move one or more of the resonators 12(1)–12(n) to change the distance between the resonators 12(1)–12(n) and the waveguide 14(1), although the modules 30 could be coupled to the waveguide 14(1) instead of the resonators 12(1)–12(n) to change the distance between the waveguide and the resonators 12(1)–12(n).

The optional control system 32 is coupled to each of the resonator modules 30 and the amplifier 34. The control system 32 comprises a programmable computer system that can be programmed or manipulated to control the resonator modules 30, although the system 32 may comprise circuitry hardwired to control the modules 30. Further, the control system 32 can control the resonator modules 30 to alter the refraction index and/or the finesse value of one or more of the resonators 12(1)–12(n).

The optional amplifier 34 is coupled to the waveguide 14(1) downstream from the input light source 18 and upstream from the resonators 12(1)–12(n). The amplifier 34 has a saturated output power such that the amplifier 34 changes the amplitude of the signal 40 in such a manner that an "N" value, defined further herein below, is about 0.5 or higher.

The operation of the system 10(1) for manipulating optical pulses to implement a pulse shaping device in accordance with another embodiment of the present invention will now be described. The process begins by the input light source 18 emitting an input light signal 40 into the waveguide 14(1).

Next, the refractive index of the resonators 12(1)–12(n) must be tuned such that the incoming pulse 40 wavelength is on resonance with all of the resonators 12(1)–12(n), assuming they have substantially overlapping resonances. In practice, the resonators 12(1)–12(n) will have substantially overlapping resonances, although it may be desired to have one or more resonators 12(1)–12(n) with different resonances. In embodiments of the invention, the refractive index of the resonators 12(1)–12(n) can be set during the etching process for creating the resonators 12(1)–12(n) as described above. Alternatively, the control system 32 can control the resonator modules 30 to change the refractive index of the resonators 12(1)–12(n) by applying heat and/or a voltage across the resonators, for example, depending on the type of device used to implement the resonator module 30.

Next, before the input light signal 40 can be compressed or stretched, for example, the N value described by the following Eq. (10):

$$N = \sqrt{\frac{\gamma_{eff}|A|^2 T_P^2}{k''_{eff}}}$$

must be at least 0.5 for the particular input light signal 40. Each of the parameters in Eq. (_) is defined further herein below in the "Theoretical Foundations" section. If necessary, one or more parameters may be adjusted so that N is 0.5. For example, the amplitude "A" of the input light signal 40 may be adjusted by the amplifier 34 to interact with the other parameters (e.g., $\gamma_{eff}$, A, $k_{eff}''$, $T_P^2$) in such a manner that N is certain to equal or greater than 0.5 based on the other parameters.

Next, to compress the incoming pulse signal 40, for example, to produce the stretched pulse signal 44, the incoming pulse signal 40 must be controlled so that the signal 40 has an amplitude such that the N value is greater then about 1.0. This can be accomplished by coupling a second amplifier (not illustrated) to the waveguide 14(1) downstream from the first amplifier 34 and upstream from the resonators 12(1)–12(n), although just one amplifier 34 can be used where the amplifier 34 amplifies the incoming pulse signal 40 an amount such that N is about greater than 1. Alternatively, to stretch the incoming pulse signal 40 to produce the stretched pulse signal 44, the incoming pulse signal 40 must be controlled so that the signal 40 has an amplitude such that the N value is less than about 1.0, but greater than 0.5. In this case, just the amplifier 34 needs to be used. It should be noted that where the N value is equal to 1, the shape of the incoming signal 40 will not be modified.

Next, regardless of whether the incoming signal 40 is being compressed or stretched, the finesse value for each of the resonators 12(1)–12(n) can be used to control the degree to which the signal 40 is compressed or stretched. For example, a higher finesse value results in a greater degree of compression or stretching, while a lower finesse value results in a lesser degree of compression or stretching.

As defined in further detail below in the "Theoretical Foundations" section, the finesse value corresponds to the number of times a signal will propagate through one of the resonators 12(1)–12(n). Further, the finesse value for a resonator is influenced by the distance between an outermost edge of the resonator and an outermost edge of the waveguide 14(1). The greater the distance between the resonator and the waveguide 14(1), the higher the finesse value. Conversely, the smaller the distance between the resonator 12(1) and the waveguide 14(1), the lower the finesse value will be. Thus, where the optional resonator modules 30 are MEMS devices, the control system 32 can control the modules 30 to move the one or more of the resonators 12(1)–12(n) as desired to change the degree to which the compressed signal 42 or the stretched signal 44 is compressed or stretched, respectively.

A variation of the system 10(2) for manipulating optical pulses to implement a device that converts continuous wave light into a pulsed light train in accordance with another embodiment of the present invention will now be described with reference to FIGS. 4–5. The alternative system 10(2) in this particular embodiment is the same as described above, except the light source 18 emits continuous wave light instead of pulsed light.

The operation of the alternative system 20(2) manipulating optical pulses to implement a device that converts continuous wave light into a pulsed light train in accordance with another embodiment of the present invention will now be described. The process begins by the light source 20 emitting continuous light waves (not shown) into the waveguide 14(1). The continuous light waves propagate through the waveguide 14(1) and through the resonators 12(1)–12(n).

The characteristics of frequency mixing processes, such as harmonic generation and four-wave mixing, is enhanced by resonators 12(1)–12(n). In general, the scaling of the enhancement of these processes can be inferred by including contributions from each intensity involved, lying within a resonance, and the interaction length. Each contributes a factor proportional to the finesse value. Four-wave mixing is a third-order nonlinear process that annihilates two photons at one frequency and generates two photons at higher and lower frequencies. Four-wave mixing can give rise to modulation instability whereby a low-contrast amplitude ripple grows by the amplification of sidebands at the expense of the central frequency. In a dispersive medium, four-wave mixing is stifled owing to phase mismatch. However, in an anomalous dispersive medium, positive nonlinear self phase modulation ("SPM") as described herein generates new frequency components that compensate for the mismatch, as disclosed in G. P. Agrawal, Nonlinear Fiber Optics, 3rd ed. (Academic, San Diego, Calif. 2001), which is hereby incorporated by reference herein in its entirety. If the process is allowed to continue, the modulation depth increases until a train of solitons stabilizes.

The peak of the effective instability gain, $gm=2\gamma_{eff}|A_0|^2$, occurs at some modulation frequency:

$$\Omega_m = \sqrt{2\gamma_{eff}|A|^2/k_{eff}''|}, \quad (25)$$

provided that this value does not exceed the resonance bandwidth. The parameters given in Eq. 25 above are defined further herein below in the "Theoretical Foundations" section. The gain is enhanced by the square of the finesse value for the resonators $12(1)$–$12(n)$.

Next, a repetition rate is calculated by dividing the Omega value $\Omega_m$ by 2 pi. Further, for a particular length of the portion of the waveguide $14(1)$ with the resonators $12(1)$–$12(n)$ coupled thereto, there is a minimum gm value that must be reached in order to generate the pulse train which is governed by the continuous wave amplitude according to the equation.

Next, along with the input continuous wave emitted by the input light source 18, random background noise is desireable, but a small amount of a separate continuous light signal separated in frequency by the repetition rate calculated above will make this process more efficient.

Figure 5:
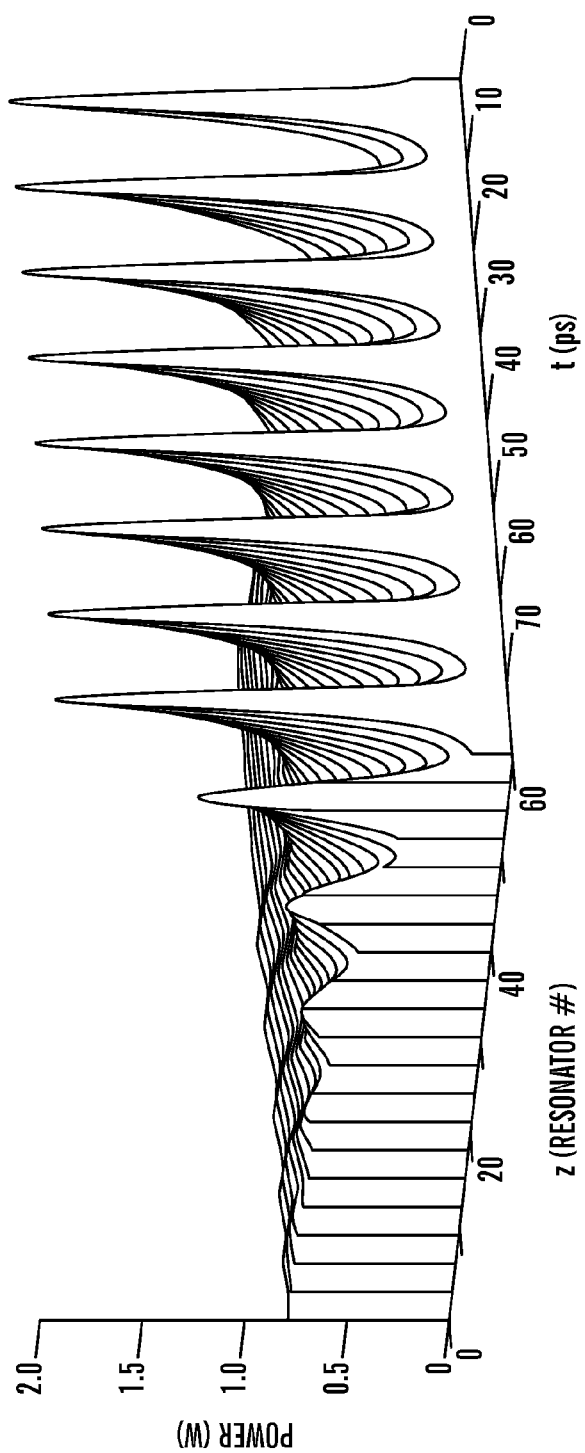
FIG. 5 is a graph showing how continuous waves are converted to pulse signals in accordance with an embodiment of the present invention.

Referring to FIG. 5, the graph shows the increase in modulation depth for a seeded 1% amplitude ripple of 100 GHz with propagation distance for a sequence of resonators $12(1)$–$12(n)$, where n is 60 and thus there are 60 resonators. Further, the input signal comprises 800 mW of continuous wave power with a 1% power ripple. The parameters are selected for system $10(2)$ such that the peak of the instability gain is at the input modulation frequency of 100 GHz. Note that the modulation frequency given by Eq. (25) need not be a resonance frequency of the resonators $12(1)$–$12(n)$.

Thus, the continuous light is emitted into the waveguide $14(1)$ until the system $10(2)$ it is no longer desired to be operated.

Until this point, attention has been restricted to pulses whose bandwidth is of the order or less than that of a single resonance peak. Copropagating pulses with carrier frequencies lying within differing resonance peaks can enhance four-wave mixing processes with frequency separations of pump and signal equal to an integer number of FSRs. Because the efficiency of idler generation depends on the pump intensity and signal intensity, and grows quadratically with length, the efficiency scales as the fourth power of the finesse. Such effects are expected to be important in a system $10(1)$ that has low intrinsic dispersion such that the FSR is independent of frequency so that the three enhancement linewidths coincide with signal, pump, and idler frequencies. Finally, the efficiency of harmonic generation processes may be increased. The efficiency of second-harmonic generation, for example, would be enhanced cubically with the finesse.

Theoretical Foundations

Figure 6:
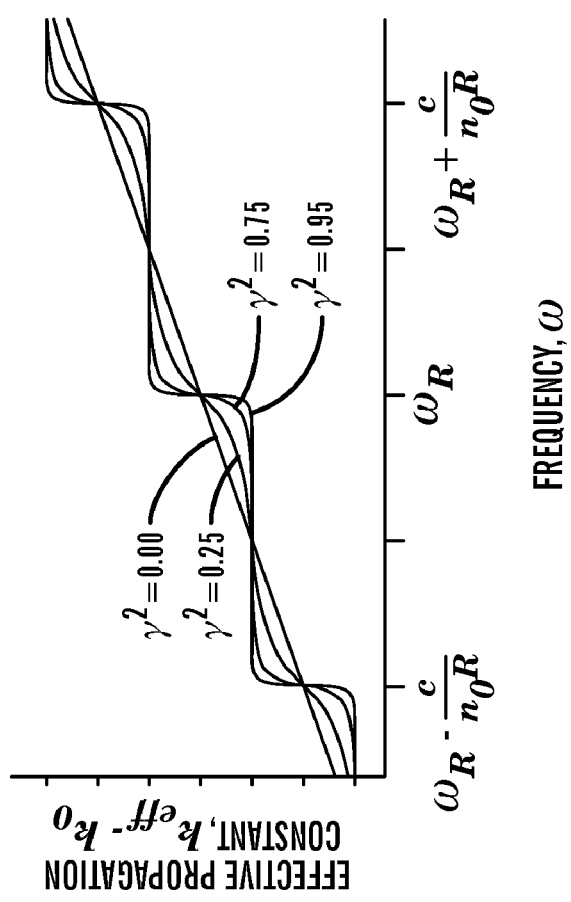
FIG. 6 is a graph showing a dispersion relation for light propagation in accordance with embodiments of the present invention.

Referring to FIG. 6, a plot of the dispersion relation for various values of a coupling parameter r is shown. The X axis represents the radian frequency and the Y axis represents the propagation constant. The deviation in the curve from a straight line for an ordinary (i.e., dispersionless) waveguide will lead to periodic changes in the group velocity and group-velocity dispersion ("GVD") with a periodicity of $c/n_{eff}R$. For generality, the waveguide $14(1)$ contribution of constant slope k0 has been subtracted from the effective propagation constant keff.

A pulsed waveform can be decomposed into the product of a slowly varying envelope A(t) and a carrier wave with frequency $\omega 0$ as $E(t) \equiv \frac{1}{2}A(t)\exp(-i\omega_0 t)+c.c.$ The relationship of the carrier frequency to some resonance frequency sets the central operating point on the dispersion relation curve and thus prompts the definition of a normalized detuning $\phi 0=(\omega 0-\omega R)TR$, where $TR=FSR-1$ is the transit time of one of the resonators $12(1)$–$12(n)$ and $\omega R$ is the closest resonance frequency. The transfer function of one of the resonators $12(1)$–$12(n)$ can be expanded in two embedded Taylor's series, one for the transmitted phase shift, expanded about the normalized detuning $\phi 0$, and one for the exponential, expanded about the transmitted phase shift of the carrier $\Phi 0$ as shown below:

$$H(\omega) = \exp(i\phi)$$

$$H(\omega) = \exp(i\phi) \quad (10)$$

$$= \exp(i\Phi_0)\left\{1 + \sum_{n=1}^{\infty}\frac{i^n}{n!}\left[\sum_{m=1}^{\infty}\frac{1}{m!}\frac{d^m\Phi}{d\phi^m_0}\right] \times (\phi-\phi_0)^m\right]^n\right\}.$$

Using this formal expansion, the transmitted signal $E_2$ is related to the incident signal $E_1$ and the transmitted phase shift induced by each of the resonators $12(1)$–$12(n)$ is distributed over the spacing L so that the effective propagation constant is independent of propagation distance at the macroscopic scale. The signal at some point $zj+1$ separated an infinitesimally small distance $\delta z$ from the signal at another zj is given by a similar equation that distributes the resonator $12(1)$–$12(n)$ contribution and includes that of the waveguide $14(1)$:

$$E_{j+1}(\omega) = \exp\left[i\left(\frac{n\omega_0}{c} + \frac{\Phi_0}{L}\right)\delta z\right] \quad (11)$$

$$\left\{1 + \sum_{n=1}^{\infty}\frac{i^n}{n!}\left[\frac{n_{eff}}{c}\Delta\omega\delta z + \sum_{m=1}^{\infty}\frac{1}{m!}\frac{\delta z}{L}\frac{d^m\Phi}{d\phi^m_0}(\phi-\phi_0)^m\right]^n\right\}\tilde{E}_j(\omega).$$

Taking the Fourier transform of this equation results in a difference equation relating the pulse envelopes at the two points:

$$A_{j+1}(t) = A_j(t) + \quad (12)$$

$$\sum_{n=1}^{x}\frac{i^n}{n!}\left[i\frac{n_{eff}}{c}\delta z\frac{\partial}{\partial t} + \sum_{m=1}^{\infty}\frac{1}{m!}\frac{\partial}{L}\frac{d^m\Phi}{d\omega^m}\phi_0\left(i\frac{\partial}{\partial t}\right)^m\right]^n A_j(t).$$

Finally, the differential approximation $[Aj+1(t)-Aj(t)/\delta z \to dA/dz$ is made and allow $\delta z$ to go to zero. Implicit in this assumption is that each of the resonators $12(1)$–$12(n)$ is not strongly driven (i.e., the transmitted phase shift $\Phi$ per resonator is small with respect to unity). This procedure yields a linear propagation equation for the pulse envelope:

$$\frac{dA}{dz} = \left[ -\frac{n_{eff}}{c}\frac{\partial}{\partial t} + i\sum_{m=1}^{\infty} \frac{1}{m!}\frac{1}{L}\frac{d^m\Phi}{d\omega^m}\phi_0\left(i\frac{\partial}{\partial t}\right)^m \right]A. \quad (13)$$

The different terms in Eq. 13 are isolated and examined below. The increased phase sensitivity on resonance is related to an increased group delay per each of the resonators $12(1)$–$12(n)$. This extra delay distributed amongst the resonators $12(1)$–$12(n)$ is responsible for a slower group velocity. The inverse of the group velocity is proportional to the frequency derivative of the propagation constant as shown below:

$$k'_{eff} = \frac{dk_{eff}}{d\omega} = \frac{n_{eff}}{c} = \frac{1}{L}\frac{d\Phi}{d\omega} = \quad (14)$$

$$\frac{n_{eff}}{c}\left[ 1 + \frac{2\pi R}{L}\left(\frac{1=r^2}{1-2r\cos\phi_0+r^2}\right) \right]_{\phi_0=0,r\approx 1} \to \frac{n_{eff}}{c}\left(1+\frac{4R}{L}F\right).$$

The group velocity $1/k'_{eff}$ is seen to be composed of contributions from propagation in the waveguide $14(1)$ and discrete delays introduced by the resonators $12(1)$–$12(n)$. The component of the group-velocity reduction that is introduced by the resonators $12(1)$–$12(n)$ is proportional to the finesse and can dominate the waveguide $14(1)$ for moderate values of the finesse.

Group-Velocity Dispersion

While propagation in the waveguide $14(1)$ itself is assumed to be dispersionless, strong dispersive effects are induced by the contribution of the resonators $12(1)$–$12(n)$. The GVD is proportional to the second frequency derivative of the effective propagation constant, as shown below:

$$k''_{eff} = \frac{dk^2_{eff}}{d\omega^2} = \frac{1}{L}\frac{d^2\Phi}{d\omega^2} = \quad (15)$$

$$\frac{T_R^2}{L}\frac{-2r(1-r^2)\sin\phi_0}{(1-2\cos\phi_0+r^2)^2}\Big|_{\phi_0=\pm\phi_{GVD},r\approx 1} \to \pm\frac{3\sqrt{3}}{4\pi^2}\frac{F^2 T_R^2}{L}.$$

While the GVD coefficient is zero on resonance, appreciably strong normal (i.e., positive) or anomalous (i.e., negative) values of the dispersion can be obtained on the red (i.e., lower) or blue (i.e., higher) side of resonance. The dispersion maxima occur at detunings $\phi 0=+\phi GVD=+\pi/F$, $\sqrt{3}$, where the magnitude of the GVD is proportional to the square of the finesse. This induced structural dispersion can be many orders of magnitude greater than the material dispersion of typical optical materials, as disclosed by G. Lenz, B. J. Eggleton, C. R. Giles, C. K. Madsen, and R. E. Slusher, "Dispersive properties of optical filters for WDM systems," IEEE J. Quantum Electron. 34, 1390–1402 (1998), which is hereby incorporated by reference herein in its entirety.

As an example, a 10-ps optical pulse propagating in resonators $12(1)$–$12(n)$ with a finesse of about $10\pi$, an FSR of about 10 terahertz (i.e., ~5 μm diameter), and a spacing of about 10 μm experiences a GVD coefficient k''eff of about 100 ps2/mm. In general, this structural dispersion can be as much as 7 orders of magnitude greater than material dispersion in conventional materials, such as silica fiber (20 ps2/km).

Figure 7:
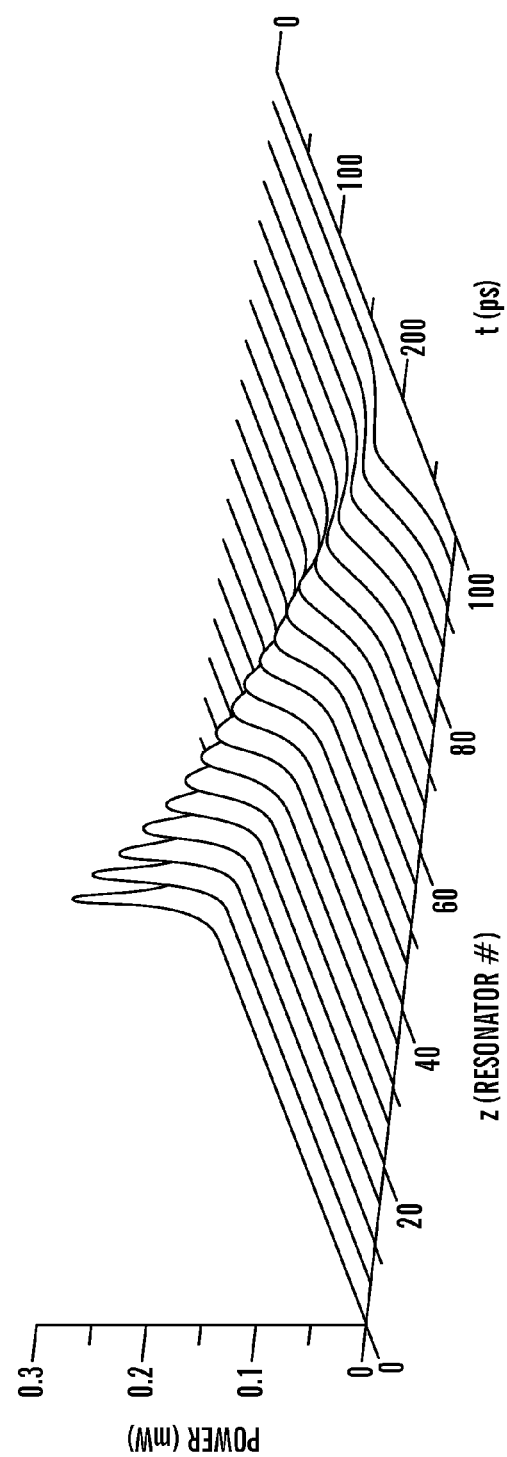
FIG. 7 is a graph showing a weak pulse tuned to the dispersion maxima that is dispersing in accordance with embodiments of the present invention.

Referring to FIG. 7, the graph shows the pulse evolution for a 10-ps pulse propagation through about 100 resonators, each tuned to the anomalous dispersion maxima. A weak pulse tuned to the dispersion maxima disperses while propagating in the waveguide $14(1)$. A 10-ps FWHM hyperbolic secant pulse tuned for maximum anomalous GVD (B=0.13) enters the system comprising 100 resonators each with a 5-μm diameter and finesse of $10\pi$, spaced by 10 μm. Note that the peak power is reduced by a factor of ~4 after propagating only 1 mm as a consequence of the strong induced dispersion.

Higher-Order Dispersion

Higher orders of dispersion may be derived from Eq. (13), each subsequently possessing a maximum that is proportional to the cavity lifetime FTR to the nth power. Specifically, the third-order dispersion coefficient is $$k'''_{eff} \equiv \frac{1}{L}\frac{d^3\Phi}{d\omega^3} = \quad (16)$$

$$\frac{T_R^3}{L}\frac{-2r(1-r^2)[1+r^2)\cos\phi_0 - 3r + r\cos 2\phi_0]}{(1-2r\cos\phi_0+r^2)^3}\Big|_{\phi_0=0,r\approx 1} \to \frac{4}{\pi^3}\frac{F^3 T_R^3}{L}.$$

It is important to note that all orders of dispersion become significant when the pulse bandwidth is nearly as wide as the resonance bandwidth.

Nonlinear Phase Shift

In addition to inducing a strong group delay and dispersion, resonators $12(1)$–$12(n)$ may enhance a weak nonlinearity. If the resonator possesses a nonlinear refractive index, i.e., Kerr nonlinearity, then the internal phase shift will be intensity dependent. For simplicity, the nonlinearity of the waveguide $14(1)$ is neglected in what follows, since it is expected to be small. The intensity-dependent contribution of the resonators $12(1)$–$12(n)$ to the internal phase shift is given by $\gamma 2\pi R|\tilde{E}_3|2$, where $\gamma$ represents the strength of the intrinsic nonlinear propagation constant.

This parameter is, of course, traditionally fixed for a given material system and can be as low as 0.002 m-1W-1 for standard single-mode silica fiber or as high as 100 m-1W-1 in an air-clad AlGaAs or chalcogenide-glass-based waveguide $14(1)$. For the purpose of quoting the material nonlinearity of standard silica fiber, a default to a more intuitive definition of the nonlinear coefficient $\gamma$ has been taken such that $\gamma PL$ is the nonlinear phase shift acquired for a power level of P over a distance L. Near resonance, the transmitted phase shift is sensitively dependent on the internal phase shift, which is in turn dependent on an enhanced circulating intensity. The combined action of these effects gives rise to a dually enhanced effective nonlinear propagation constant $\gamma$eff, calculated from the derivative of the transmitted phase shift with respect to the input intensity:

$$\gamma_{eff} \equiv \frac{1}{L}\frac{d\Phi}{d|\tilde{E}_1|^2} = \frac{1}{L}\frac{d\Phi}{d\phi}\frac{d\phi}{d|\tilde{E}_3|^2}\frac{d|\tilde{E}_3|^2}{d|\tilde{E}_1|^2} = \quad (17)$$

$$\frac{\gamma 2\pi R}{L}\left(\frac{1-r^2}{1-2r\cos\phi_0+r^2}\right)^2\Big|_{\phi_0=,r\approx 1} \to \gamma\frac{8R}{\pi L}F^2.$$

As can be seen from this equation, the increased phase sensitivity (or group-velocity reduction) and the buildup of intensity contribute equally to quadratically enhance the nonlinear propagation constant with respect to the finesse, as disclosed by J. E. Heebner and R. W. Boyd, "Enhanced all-optical switching by use of a nonlinear fiber ring resonator," Opt. Lett. 24, 847–849 (1999), which is hereby incorporated by reference herein in its entirety. To properly account for the all the third-order Kerr nonlinear contributions of the spectral components of three signals, a double convolution of the three interacting signals is performed in the spectral domain. In the time domain the double convolution operation is equivalent to multiplication. This allows for the straightforward addition of a nonlinear contribution to the internal phase shift term in the linear propagation equation Eq. (13):

$$\frac{dA}{dz} = \left\{ -\frac{n_{eff}}{c}\frac{\partial}{\partial t} + i\sum_{m=1}^{\infty} \frac{1}{m!}\frac{1}{L}\frac{d^m\Phi}{d\phi^m}\phi_0 \times \left(\gamma 2\pi RB|A|^2 + iT_R\frac{\partial}{\partial t}\right)^m \right\} A. \quad (18)$$

as disclosed by G. P. Agrawal, *Nonlinear Fiber Optics*, 3$^{rd}$ ed. (Academic, San Diego, Calif. 2001), which is hereby incorporated by reference herein in its entirety. For two nonlinearly interacting resonant pulses, the results derived here for the self-phase modulation (SPM) effect apply to the cross-phase modulation effect equivalently.

Solitons

Next, the nonlinear propagation equation that retains only the lowest-order dispersive and nonlinear terms in Eq. (18) is examined and shift the time coordinate to the reference frame of the pulse (t'=t−k'effz). What is found is that in this limit, the pulse evolution is governed by a nonlinear Schrödinger equation with effective GVD and SPM parameters:

$$\frac{\partial}{\partial t}A = -i\frac{1}{2}k''_{eff}\frac{\partial}{\partial t'^2}A + i\gamma_{eff}|A|^2 A. \quad (19)$$

Soliton solutions exist provided that the enhanced nonlinearity and induced dispersion are of opposite signs. While the sign of the enhanced nonlinearity is predetermined by the sign of the intrinsic nonlinearity, the sign of the induced dispersion is, as was previously shown in Eq. (15), determined by the sign of the normalized detuning from resonance. The fundamental soliton solution for this equation is:

$$A(z,t') = A_{0sec\ h}(t'/T_P)\exp(i\frac{1}{2}\gamma_{eff}|A_0|^2 z), \quad (20)$$

where the amplitude and pulse width are related according to $|A_0|^2 = k''_{eff}/\gamma_{eff} T^2_P$, below which the pulse is severely distorted by all orders of dispersion. The finite response time of the resonator places a lower bound on the pulsewidth $T_P$. A scaling factor B is defined to be the ratio of the pulse bandwidth [2 arcsech$(1/\sqrt{2})/\pi^2 T_P$] to the resonator bandwidth $(1/FT_R)$, such that B=[2 arcsech$(1/\sqrt{2})/\pi^2]FT_R/T_P$. A nonlinear strength parameter is defined as $\Gamma = (4/\pi^2)F^2\gamma|A_0|^2 R$. With these definitions a simple relation holds between $\Gamma$ and B for the fundamental soliton operating at the anomalous dispersion peak. The values of k'$_{eff}$ and $\gamma_{eff}$ are lowered by factors of ¾ and ⁹⁄₁₆, respectively, from their given maximum values when operating at dispersion extremum points.

$$\Gamma = \frac{\pi}{2\sqrt{3}\ \text{arcsech}^2(1/\sqrt{2})}B^2 \approx B^2. \quad (21)$$

Higher-order dispersive and nonlinear terms become increasingly significant when either B or $\Gamma$ approach unity.

Figure 10:
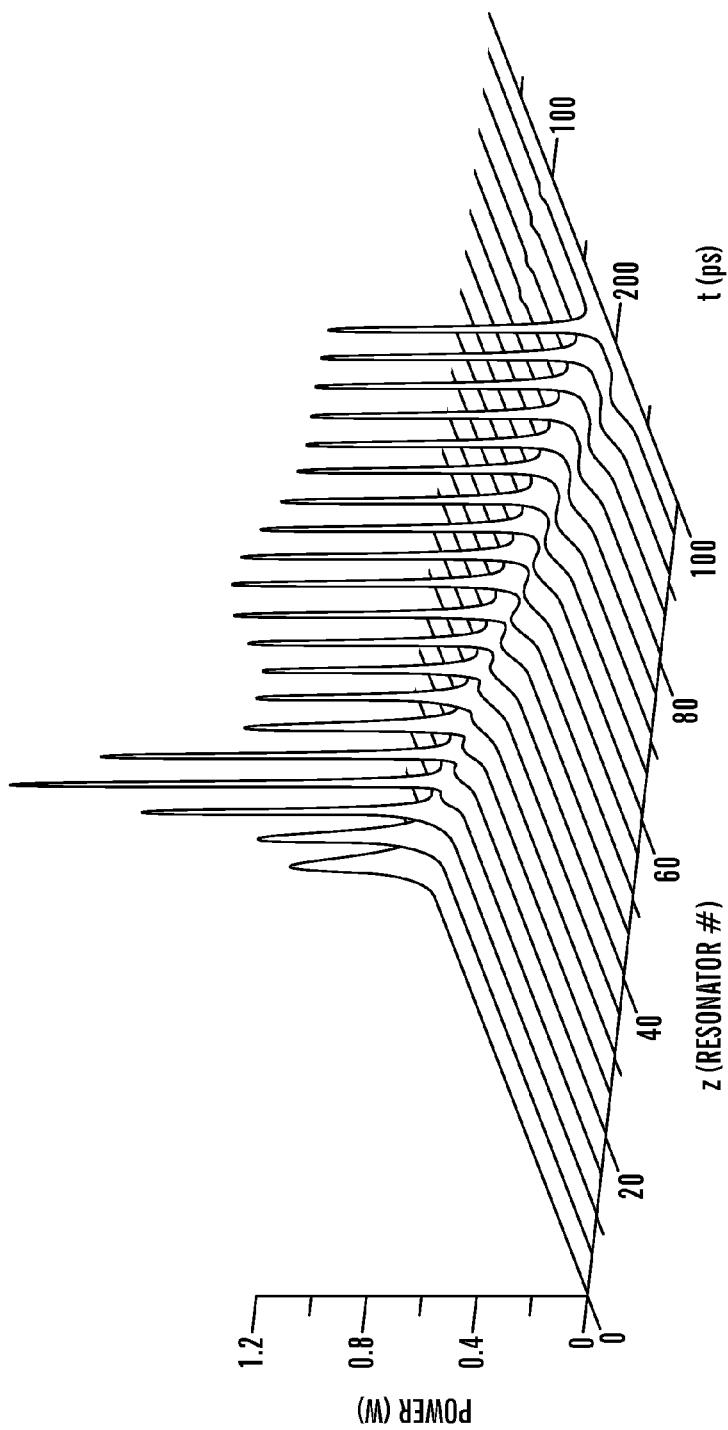
FIG. 10 is a graph showing a higher-order breathing soliton that is unstable under the influence of resonators intensity-dependent group velocity in accordance with embodiments of the present invention.

To test the validity of this approximation, rigorous time-domain simulations were conducted in an attempt to propagate solitons. The simulations used to study pulse evolution in a sequence of waveguide-coupled resonators were carried out by an iterative method in which each iteration comprised linear and nonlinear phase accumulation during one round trip within the resonator followed by interference at the coupler. Traditional beam or pulse propagation split-step Fourier methods are unnecessary, as structural dispersion is more readily treated in the time domain. FIG. 3 shows the pulse evolution of a low-power 10-ps FWHM hyperbolic secant pulse tuned for maximum anomalous GVD (B=0.13) in a chalcogenide-glass-based system. The system comprises 100 resonators spaced by 10 μm each with a 5-μm diameter and finesse of 10π. As can be seen, the temporal pulse profile is greatly dispersed. FIG. 10 shows the pulse evolution for the same system but with a peak power of 125 mW, corresponding to the resonators 12(1)–12(n) soliton ($\Gamma$=0.0196).

As can be seen, the pulse shape is well preserved on propagation. Many of the familiar characteristics of fundamental solitons such as robustness, reshaping, pulse compression, and pulse expansion have been observed in simulations to carry over from the continuous-medium case. Higher-order solitons, satisfying $\Gamma \approx N2B2$, where N is an integer, are readily observed in simulations but are unstable because of higher-order dispersive nonlinear effects present in this system. Additionally, higher-order dispersive or nonlinear effects render the scattering of solitons inelastic. Under these conditions, the term "solitary wave" is more appropriate.

Figure 8:
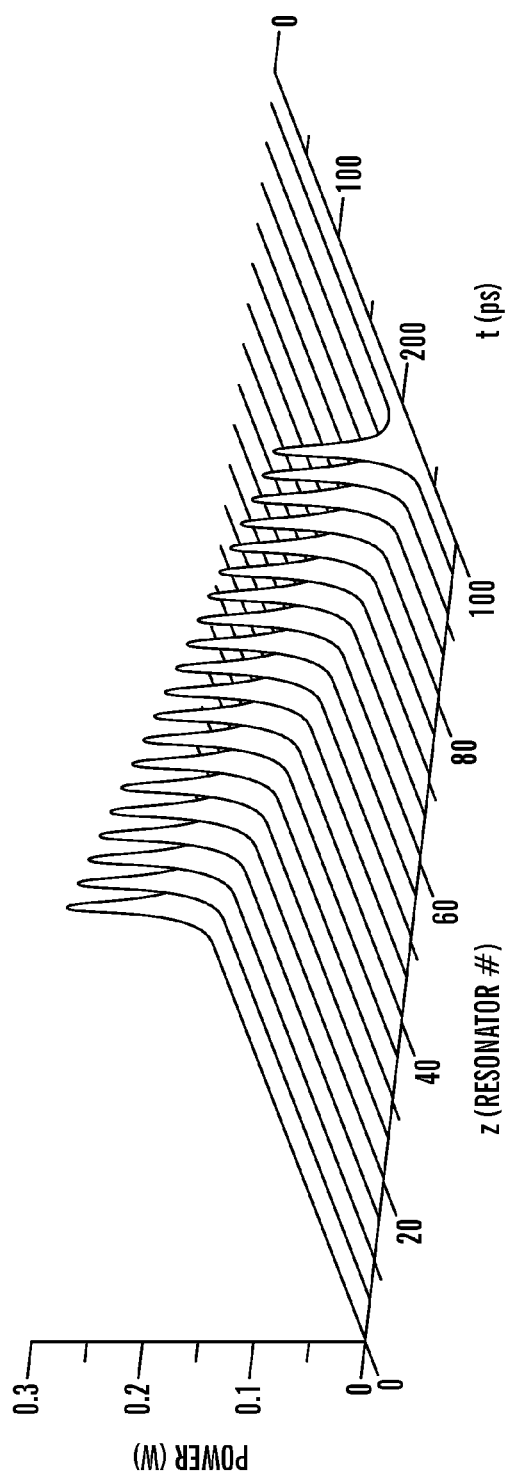
FIG. 8 is a graph showing a pulse with an amplitude corresponding to the fundamental soliton that is propagating in accordance with embodiments of the present invention.
Figure 9:
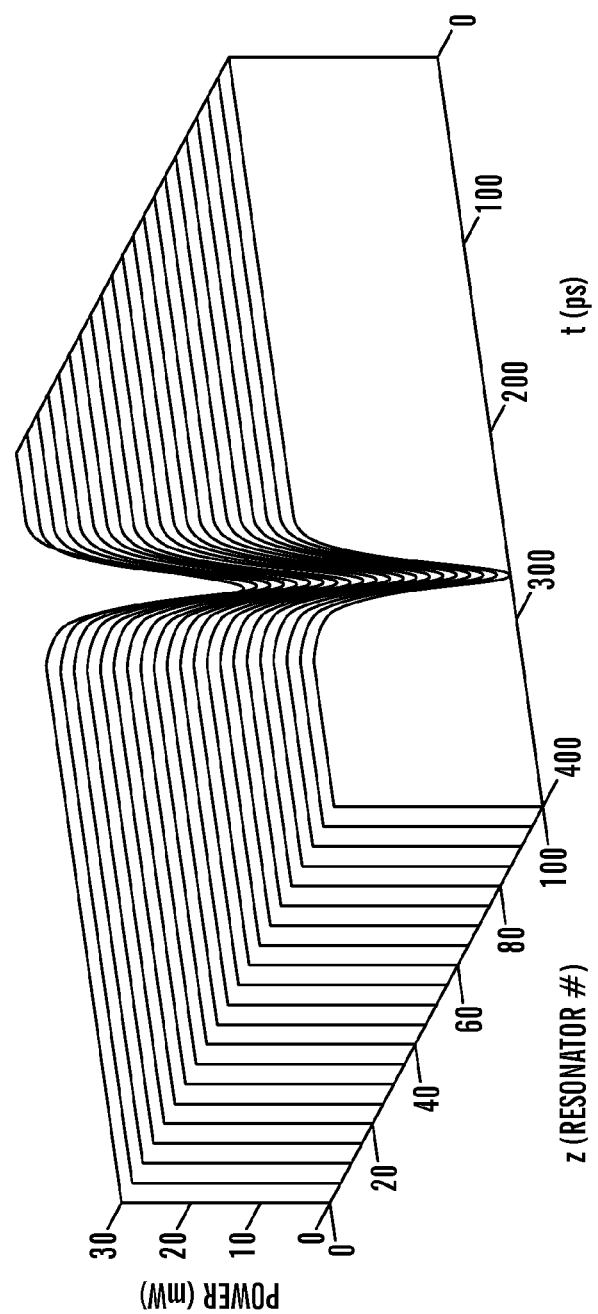
FIG. 9 is a graph showing a negative pulse in a uniform intensity background with parameters corresponding to the fundamental dark soliton that is propagating without dispersing in accordance with embodiments of the present invention.

Dark solitons that have an intensity dip in an otherwise uniform continuous-wave signal can also be supported if the enhanced nonlinearity and induced dispersion are of the same sign (on the other side of resonance). FIG. 9 shows the propagation of the fundamental dark soliton (a hyperbolic tangent signal distribution) tuned to the normal dispersion peak. A negative pulse in a uniform intensity background with parameters corresponding to the fundamental dark soliton propagates in resonator 12(1)–12(n) without dispersing. The incident signal distribution was a hyperbolic tangent with twice the pulse width of the bright soliton and a background power that was one fourth that of its peak power in FIG. 8.

Self-Steepening

In previous sections, the frequency dependence of γeff was neglected. One of the effects resulting from the frequency-dependent nature of γeff is an intensity-dependent group velocity. This effect leads to the phenomenon of self-steepening ("SS") of a pulse, where the peak of a pulse travels slower than (+SS) or faster than (−SS) its wings. The SS coefficient "s" may be derived from Eq. (18), but it is more readily obtained from the frequency derivative of the nonlinear coefficient:

$$s = \frac{\gamma'_{eff}}{\gamma_{eff}} = \frac{2}{B}\frac{dB}{d\omega}\bigg|_{0=\pm D, r\approx 1} \pm \sqrt{\frac{3FT_R}{\pi}}. \quad (22)$$

To expand Eq. (18) correctly, the β term must also be expanded, which will generate more time derivative terms within the square brackets. Thus the SS contribution will have not only two m=2 terms but also one m=1 term. For terms such that m>1, the time derivatives implicitly appear to the far left of each term when the square brackets are expanded. While it is difficult to isolate this effect from induced GVD in a sequence of resonators $12(1)$–$12(n)$ to form a steepened pulse, it plays an important role in the breakup of higher-order solitons. The known phenomenon of soliton decay involves the breakup of an Nth-order breathing soliton into N fundamental solitons of differing pulse amplitudes and widths.

Referring to FIG. 10, a situation in which a second-order soliton with a launched peak power of 500 mW undergoes decay and splits into two stable fundamental solitons is shown. The solitons are well isolated in time and uncorrupted by a background or pedestal. One of them possesses a higher peak power and narrower width than the original, demonstrating the potential for pedestal-free optical pulse compression. The effects of induced SS in a sequence of resonators $12(1)$–$12(n)$ can take place for picosecond and even nanosecond pulses because, unlike the case of intrinsic SS, the relative strength of SS to SPM is not governed by how close the pulse width is to being a single optical cycle, $2\pi/\omega_0$, but rather how close the pulse width is to being a single cavity lifetime FTR. For the 10-ps pulse propagating in resonators $12(1)$–$12(N)$ with the above parameters, the non-dimensional SS parameter (Tps) is 0.173. In order to observe the same effect with traditional intrinsic SS, a single-cycle 5-fs pulse would be required.

Figure 11A:
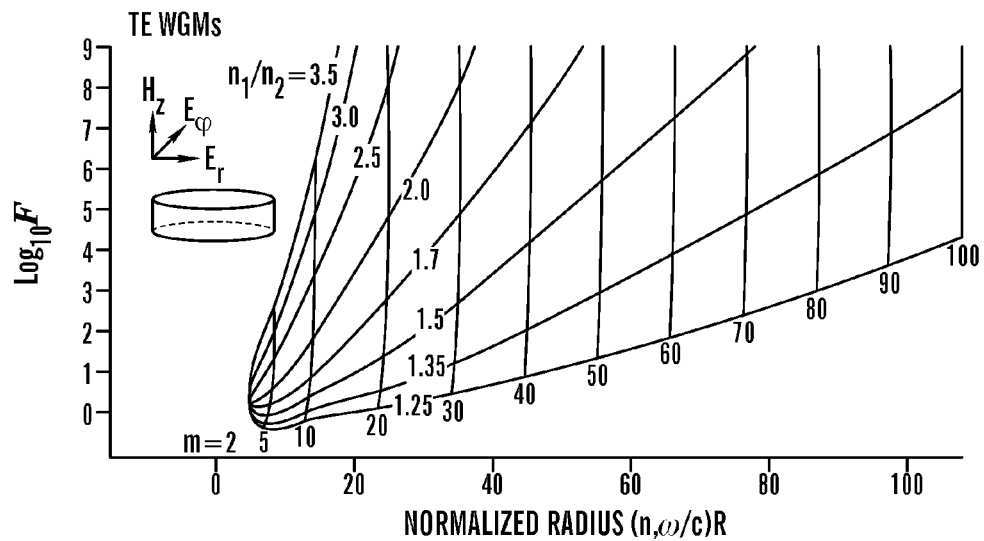
FIG. 11 is a graph showing a radiation-loss-limited finesse of the lowest-order radial TE and TM whispering gallery modes of a dielectric cylinder of index $n_1$ plotted versus normalized radius in accordance with embodiments of the present invention.
Figure 11B:
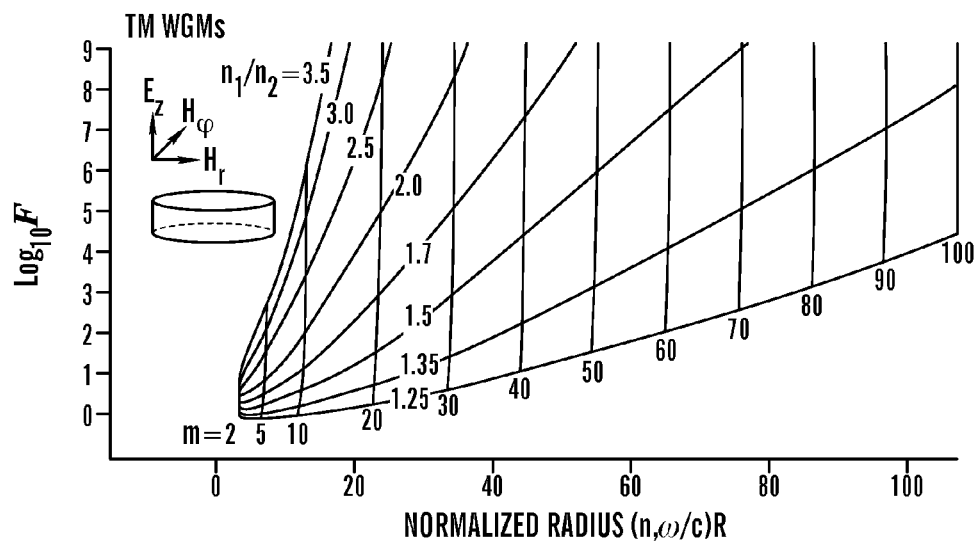

Referring to FIG. 11, a higher-order breathing soliton is unstable under the influence of the resonator-induced intensity-dependent group velocity (SS). Here, a second-order soliton splits into two stable fundamental solitons on propagation in resonators. The incident signal distribution was the same as in FIG. 6 but with four times the peak power.

Multistability and Saturation

In the previous section, the SS correction was added to the nonlinear coefficient that resulted from the frequency dependence of $\gamma_{eff}$. Relation (17) was implicitly derived with the assumption of low intensity. Now the intensity dependence of $\gamma_{eff}$ is examined. This examination finds that the circulating intensity and $\gamma_{eff}$ are in fact interdependent. The circulating intensity depends on the buildup factor, which in turn depends on the circulating intensity from the nonlinear detuning contribution. As a result nonlinear resonators can possess memory and multistable branches in the input-output relationships within certain operating regimes, as disclosed by H. M. Gibbs, *Optical Bistability: Controlling Light with Light* (Academic, New York, 1985), which is hereby incorporated by reference herein in its entirety.

When operated near resonance, the onset of multistability occurs when the circulating power is high enough to generate a single-pass nonlinear phase shift of $2\pi$ rad. Saturation resulting from intensity-dependent detuning's pulling the resonator off resonance generally takes place well before this effect. Working on the lower branch of the multistable relation for positive detunings, it is found that the saturation of the effective nonlinear propagation constant is well fitted by a $(1+I/Is)-1$ type of saturation model, which is given explicitly as:

$$\gamma_{eff}(|A|^2) \xrightarrow{r\approx 1} \frac{\gamma \frac{2\pi R}{L} B_{\Phi_0}^2}{1 + \frac{\gamma 2\pi R B_{\Phi_0}^2}{2\pi - \Phi_0}|A|^2}, \quad (23)$$

where the saturating intensity near resonance is $[A_s]^2 = \pi/\gamma_{eff}L$. The saturating intensity is lower for higher detunings from resonance. A generalized nonlinear Schrödinger equation incorporating every effect discussed so far takes the following form:

$$\frac{\partial}{\partial z}A + k'_{eff}\frac{\partial}{\partial t}A = \qquad (24)$$
$$i\frac{1}{2}k''_{eff}\frac{\partial^2}{\partial t^2}A + \frac{1}{6}k'''_{eff}\frac{\partial^3}{\partial t^3}A + i\left(1 + is\frac{\partial}{\partial t}\right)\frac{\gamma_{eff}|A|^2}{1+|A|^2/|A_s|^2}A.$$

Attenuation

Until this section it has been assumed that loss is negligible. Here, the effects of attenuation on the performance of resonators $12(1)$–$12(n)$ are examined. Attenuation in resonators $12(1)$–$12(n)$ is in general detrimental. Internal attenuation reduces the net transmission, buildup, and in general, the nonlinear response. It also broadens the resonance limiting the achievable finesse. Including the effects of attenuation, the finesse is calculated as:

$$F = \frac{2\pi}{2\arccos\{2ra/[1+(ra)^2]\}} \xrightarrow{ra\approx 1} \frac{\pi}{1-ra},$$

and the transmission is given by:

$$T + \frac{a^2 - 2r\cos\phi + r^2}{1 - 2ra\cos\phi + (ra)^2},$$

where a is the lumped transmission coefficient for a single pass through the resonator. If the attenuation is comparable with the cross coupling, light is resonantly attenuated strongly. Under the condition known as critical coupling (r=a), the finesse drops by a factor of 2 and, more important, the transmission drops to zero. Attenuation in resonators $12(1)$–$12(n)$ typically arises from three mechanisms, such as intrinsic absorption, radiation loss, and scattering, as disclosed by M. L. Gorodetsky, A. A. Savchenkov, and V. S. Ilchenko, "Ultimate Q of optical microsphere resonators," Opt. Lett. 21, 453–455 (1996), which is hereby incorporated herein by reference in its entirety. Intrinsic absorption can typically be rendered insignificant over millimeter-sized propagation distances by choosing an appropriate material system at a given wave-length.

Additionally, since the circulating intensity can greatly exceed the incident intensity, intensity-dependent absorption processes such as two-photon absorption may be significant in resonators. Two-photon absorption may be minimized by proper selection of a material with a bandgap that is greater than twice the incident photon energy, as disclosed by G. Lenz, J. Zimmermann, T. Katsufuji, M. E. Lines, H. Y. Hwang, S. Spalter, R. E. Slusber, S.-W. Cheong, J. S. Sanghera, and I. D. Aggarwal, "Large Kerr effect in bulk Sebased chalcogenide glasses," Opt. Lett. 25, 254–256 (2000), which is incorporated herein by reference in its entirety. Whispering-gallery modes of a disk and modes of a ring waveguide suffer from bending or radiation loss, which is increasingly important for small resonators with low refractive-index contrast.

FIG. 11 shows a plot of the radiation-loss-limited finesse of a free uncoupled resonator versus the normalized radius for various refractive-index contrasts. Scattering can take place in the bulk or on the surfaces. Surface scattering is typically the dominant loss mechanism and results from roughness on the edges of resonators 12(1)–12(n), which in practice cannot be made perfectly smooth. The surface perturbations phase match the guided mode to radiating modes. FIG. 11(a) shows a finite-difference time-domain simulation of system 10(2) with resonators 12(1)–12(n), where n is 5, with 60-nm sidewall roughness, displaying strong scattering losses and weak circulating intensity. In FIG. 13(b) a lower sidewall roughness of 30 nm results in negligible scattering loss and strong-intensity buildup.

Resonators 12(1)–12(n) have the ability to modify and in some cases enhance certain figures of merit. A common figure of merit is the ratio of the nonlinear coefficient to the linear absorption. While the nonlinear coefficient is quadratically dependent on the finesse, the linear absorption, much like the group-velocity reduction, exhibits only a linear proportionality. As a result, the figure of merit is enhanced proportional to the finesse. Gain may be implemented where possible to combat attenuation. More interestingly, a dispersion-decreasing system may be used to propagate a soliton through resonators 12(1)–12(n) in an attenuating structure. In this case the pulse width is kept constant as the amplitude decreases by means of an exponential decrease in dispersion down the length of the structure.

Referring to FIG. 11, the radiation-loss-limited finesse of the lowest-order radial TE and TM whispering-gallery modes of a dielectric cylinder of index n1 in a medium of index n2 plotted versus normalized radius (n1ω/c)R is shown. The family of diagonal curves represents varying refractive-index contrasts (n1/n2). The family of nearly vertical curves corresponds to whispering-gallery mode resonances, each characterized by an azimuthal mode number m. The plots were obtained by numerical solution of the dispersion relation for whispering-gallery modes.

Figure 12A:
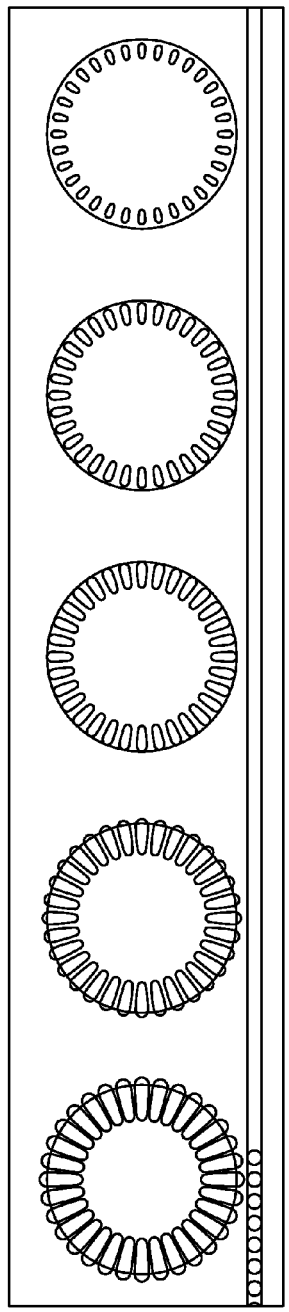
FIG. 12 is a diagram showing a finite-difference time-domain method of solving Maxwell's equations using five resonators.
Figure 12B:
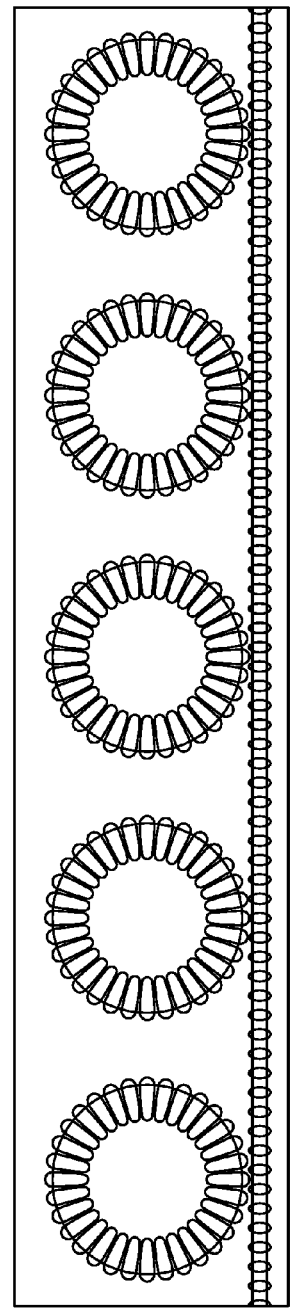

Referring to FIG. 12, a finite-difference time-domain method of solving Maxwell's equations for resonators 12(1)– 12(n), with five resonators, is shown. A TE signal of wavelength 1.55 µm is launched into the 0.4-µm-wide waveguide evanescently side coupled to a disk with a diameter of 5.1 µm. The refractive index of the air-clad disk and guide is 2. Exclusive coupling to the m=16 azimuthal whispering-gallery mode is achieved by careful selection of parameters. (a) Strong scattering losses result due to roughness associated with a 60 nm grid. (b) Scattering losses are made negligible by use of a 30-nm grid. Consequently, a buildup factor of 16 and finesse of 25 are achieved in this structure.

The systems 10(1)–10(2) in accordance with embodiments of the present invention provides a number of advantages. For example, the combination of the waveguide 14(1) and the resonators 12(1)–12(n) produce a dispersion that is about seven orders of magnitude greater than that of conventional optical fiber with similarly enhanced nonlinearity, resulting in a systems 10(1)–10(2) which can be made small enough to fit on a microchip, for example, and be integrated with other photonic technologies. Since the light signal propagating through each of the resonators 12(1)–12(n) circulates many times in each resonator before passing to the next, the group velocity of a pulse of light through such a structure is greatly reduced, producing many useful results.

Further, the systems 10(1)–10(2) enable very fast switching, routing and/or demultiplexing, for example, to take place using the resonators 12(1)–12(n) in the manner described above. The system 10(1) achieves a switching, routing and/or demultiplexing rate in the order of about 1 to 5 about picoseconds, where conventional devices can only manage rates in the range of about 4 to 50 milliseconds. As a result, the switching of pulses can be accomplished with a data rate in the order of terabits per second. The system 10(1) uses a low amount of switch energy, such as 1 pico Joule, whereas conventional device require much more.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefor, is not intended to limit the claimed processes to any order except as may be explicitly specified in the claims. Accordingly, the invention is limited only by the following claims and equivalents thereto.

What is claimed is:

1. An apparatus for manipulating optical pulses, the apparatus comprising:
   a first optical waveguide with a first input for receiving one or more optical pulses;
   a plurality of resonator structures, each of the resonator structures optically coupled to, but spaced from the first optical waveguide;
   a pulse shaping system comprising a refractive index adjustment system that changes a refraction index of one or more of the resonator structure and a finesse value adjustment system that changes a finesse value of one or more of the resonator structures by adjusting a position of at least one of the resonator structures with respect to the first optical waveguide; and
   a control system that controls the refractive index adjustment system and the finesse value adjustment system to control a manipulation of one or more optical pulses on the first optical waveguide.

2. The apparatus as set forth in claim 1 wherein the refractive index adjustment system further comprises at least one heat generating source positioned adjacent at least one of the resonator structures.

3. The apparatus as set forth in claim 2 wherein the at least one heat generating source comprises at least one temperature resistive heater.

4. The apparatus as set forth in claim 1 wherein the refractive index adjustment system further comprises an electric-optical system coupled to at least one of the resonator structures.

5. The apparatus as set forth in claim 1 wherein the finesse value adjustment system further comprises a micro-electromechanical system.

6. The apparatus as set forth in claim 1 wherein at least one of the resonator structures comprises at least one of a ring shaped waveguide and a disk shaped waveguide.

7. The apparatus as set forth in claim 1 wherein each of the resonator structures has a radius ranging from about 2 µm to about 50 µm.

8. The apparatus as set forth in claim 1 wherein each of the resonator structures are spaced apart at a second distance from each other to avoid optically coupling with each other.

9. The apparatus as set forth in claim 8 wherein the second distance ranges from about 10 µm to about 20 µm, the second distance being measured from a first center portion of one of the resonator structures to a second center portion of an adjacent one of the resonator structure.

10. The apparatus as set forth in claim 1 wherein the resonator structures are formed of a glass, polymer or crystalline semiconductor material.

11. The apparatus as set forth in claim 1 further comprising an input signal adjustment system that adjusts an amplitude of the one or more optical pulses based on the manipulation.

12. A method of for manipulating optical pulses, the method comprising:
    propagating an input pulse signal along first optical waveguide;
    adjusting a refraction index of one or more of a plurality of resonator structures optically coupled to, but spaced at least a first distance away from a portion of the first optical waveguide;
    adjusting a finesse value of one or more of the resonator structures by adjusting a position of at least one of the resonator structures with respect to the first optical waveguide; and
    controlling the adjusting the refraction index of the one or more resonator structures and the adjusting the finesse value of the one or more resonator structures to control an alteration of at least one property of the input signal pulse.

13. The method as set forth in claim 12 wherein the adjusting the refraction index further comprises generating heat near at least one of the resonator structures.

14. The method as set forth in claim 12 wherein the adjusting the refraction index further comprises applying a voltage across at least one of the resonator structures.

15. A method as set forth in claim 12 wherein the adjusting the finesse value of one or more of the resonator structures is adjusted with a micro-electro-mechanical system.

16. The method as set forth in claim 12 further comprising adjusting an amplitude of the input pulse signal based on the alteration.

17. A system for manipulating optical pulses to compress or stretch the optical pulses, the system comprising:
    a first optical waveguide with a first input for receiving one or more optical pulses;
    a plurality of resonator structures optically coupled to, but spaced from the first optical waveguide;
    a pulse shaping system comprising a refractive index adjustment system that changes a refraction index of one or more of the resonator structures and a finesse value adjustment system that changes a finesse value of one or more of the resonator structures by adjusting a position of at least one of the resonator structures with respect to the first optical waveguide; and
    a controller that controls the refractive index adjustment system and the finesse adjustment system to at least one of shape, stretch, and compress the one or more optical pulses on the first optical waveguide.

18. The system as set forth in claim 17 wherein the refractive index adjustment system further comprises at least one heat generating source positioned near at least one of the resonator structures.

19. The system as set forth in claim 18 wherein the at least one heat generating source comprises at least one temperature resistive heater.

20. The system as set forth in claim 17 wherein the refractive index adjustment system furhter comprises an electro-optical system coupled to at least one of the resonator structures.

21. The system as set forth in claim 17 wherein the finesse value adjustment system further comprises a micro-electro-mechanical system.

22. The system as set for in claim 17 further comprising an input signal adjustment system that adjusts an amplitude of the one or more optical pulses based on the at least one of shape, stretch, and compress of the one or more optical pulses.

23. A method for manipulating optical pulses to compress or stretch the optical pulses, the method comprising:
    propagating an input pulse signal along a first optical waveguide;
    adjusting a refraction index of one or more of a plurality of resonator structures optically coupled to, but spaced at least a first distance away from a portion of the first optical waveguide;
    adjusting a finesse value of one or more of the resonator structures by adjusting a position of at least one of the resonator structures with respect ot the first optical waveguide; and
    controlling the adjusting of the refraction index and the adjusting of the finesse value for one or more of the resonator structures to control how the at least one property of the input signal is altered.

24. The method as set forth in claim 23 wherein the adjusting of the refraction index further comprises generating heat near at least one of the resonator structures.

25. The method as set forth in claim 23 wherein the adjusting of the refraction index further comprising applying a voltage across at least one of the resonator structures.

26. The method as set forth in claim 23 wherein the adjusting the finesse value is adjusted with a micro-electro-mechanical system.

27. The method as set forth in claim 23 further comprising adjusting an amplitude of the input pulse signal based on the alteration of the at least one property of the input signal.

* * * * *